United States Patent [19]
Raith

[11] Patent Number: 5,241,598
[45] Date of Patent: Aug. 31, 1993

[54] ROLLING KEY RESYNCHRONIZATION IN CELLULAR VERIFICATION AND VALIDATION SYSTEM

[75] Inventor: Krister A. Raith, Durham, N.C.

[73] Assignee: Ericsson GE Mobile Communications, Inc., Research Triangle Park, N.C.

[21] Appl. No.: 704,133

[22] Filed: May 22, 1991

[51] Int. Cl.$^5$ .................. H04L 9/08; H04L 9/32
[52] U.S. Cl. .......................... 380/21; 380/23; 380/43; 380/48; 380/49; 379/59; 455/33.1; 455/54.1; 340/825.31; 340/825.34
[58] Field of Search ............... 375/1; 380/21, 28, 34, 380/43, 48, 49, 23; 379/58, 59, 60; 455/33.1, 54.1; 340/825.31, 825.34

[56] References Cited

U.S. PATENT DOCUMENTS

| | | | |
|---|---|---|---|
| 3,934,078 | 1/1976 | Gannett | 380/47 |
| 4,549,308 | 10/1985 | LoPinto | 380/21 |
| 4,555,805 | 11/1985 | Talbot | 380/33 |
| 4,649,543 | 3/1987 | Levine | 371/41 |
| 4,731,840 | 3/1988 | Mniszewski et al. | 380/21 |
| 4,754,481 | 6/1988 | Feggeler | 380/41 |
| 4,803,726 | 2/1989 | Levine et al. | 380/48 |
| 4,827,507 | 5/1989 | Marry et al. | 380/38 |
| 4,860,353 | 8/1989 | Brown | 380/44 |
| 4,876,740 | 10/1989 | Levine et al. | 455/33.2 |
| 4,896,370 | 1/1990 | Kasparian et al. | 455/77 |
| 4,914,696 | 4/1990 | Dudczak et al. | 380/21 |
| 4,924,480 | 5/1990 | Gay et al. | 375/8 |
| 4,926,665 | 5/1990 | Stapley et al. | 70/277 |
| 4,955,049 | 9/1990 | Ghisler | 379/58 |
| 5,060,266 | 10/1991 | Dent | 380/49 |
| 5,091,942 | 2/1992 | Dent | 379/59 X |

*Primary Examiner*—Bernarr E. Gregory
*Attorney, Agent, or Firm*—Johnson & Gibbs

[57] ABSTRACT

A system for the resynchronization of a rolling key used as an input among a plurality of inputs to an authentication algorithm executed in a mobile station and in a radio network providing service to the mobile station. In one aspect of the system, the network rolling key input is set to a selected value and the mobile station is commanded to set the mobile station rolling key input to the same selected value. The mobile station will then set the mobile station rolling key input to the selected value in response to the command from the network.

70 Claims, 6 Drawing Sheets

ROLLING KEY RESYNCHRONIZATION IN CELLULAR VERIFICATION AND VALIDATION SYSTEM

CROSS REFERENCE TO RELATED APPLICATION

This application contains subject matter related to the co-pending U.S. patent application Ser. No. 07/677,232, entitled "Cellular Verification and Validation System" filed on Mar. 29, 1991, which incorporates by reference co-pending U.S. patent application Ser. No. 07/556,890, entitled "Authentication System for Digital cellular communications", filed on Jul. 23, 1990, now U.S. Pat. No. 5,091,942; co-pending U.S. patent application Ser. No. 07/556,358, entitled "Encryption System For Digital Cellular Communications", filed on Jul. 20, 1990; co-pending U.S. patent application Ser. No. 07/556,102, entitled "Continuous Cipher Synchronization for Cellular Communication System", filed on Jul. 20, 1990, now U.S. Pat. No. 5,060,266; and co-pending U.S. patent application Ser. No. 07/556,103, entitled "Resynchronization of Encryption Systems Upon Handoff", also filed on Jul. 20, 1990, now U.S. Pat. No. 4,081,629. All of the foregoing applications, including the subject matter contained therein, are incorporated herein by reference.

BACKGROUND OF THE INVENTION

1. Field of the Invention

The present invention relates to wireless communications systems, and more particularly, to a method and apparatus for resynchronizing a rolling key used in the validation and verification of base stations and mobile stations within a cellular radio communications system.

2. History of the Prior Art

Wireless Communications Systems

Information or data signals are carried by or transmitted through two basic categories of physical channels or media: bounded and unbounded. In a bounded medium, e.g., wire pairs, coaxial cables, waveguides, optical fibers, etc., the signals are generally confined to and, except for small leakage amounts, do not depart from, the medium. The most common type of bounded medium consists of twisted wire pairs which are grouped together in cables. In an unbounded medium, e.g., air atmosphere, ocean water, etc., electromagnetic signals or radio waves radiate freely in and spread throughout the medium. The present invention, as described hereinafter, is more particularly concerned with wireless or cordless radio communications transmitted in unbounded media.

Various radio frequency schemes have been devised to facilitate the transmission of data carrying messages in unbounded media Several communications standards for radio transmission have also been adopted or endorsed by international bodies. Examples of such standards include the Digital European Cordless Telecommunications (DECT), CT2 and CT3 standards. While the teachings of the present invention have broad applicability to radio communications systems in general, the primary focus of the discussion herein shall be cellular radio systems which are but one example of wireless communications. It will be appreciated, however, that the present invention is not limited to cellular radio systems and may be implemented in non-cellular radio systems as well.

Cellular Radio Systems

Cellular radio communications is, perhaps, the fastest growing field in the world-wide telecommunications industry. Although cellular radio communication systems comprise only a small fraction of the telecommunications systems presently in operation, it is widely believed that this fraction will steadily increase and will represent a major portion of the entire telecommunications market in the not too distant future. This belief is grounded in the inherent limitations of conventional telephone communications networks which rely primarily on wire technology to connect subscribers within the network. A standard household or office telephone, for example, is connected to a wall outlet, or phone jack, by a telephone cord of a certain maximum length. Similarly, wires connect the telephone outlet with a local switching office of the telephone company. A telephone user's movement is thus restricted not only by the length of the telephone cord, but also by the availability of an operative telephone outlet, i e. an outlet which has been connected with the local switching office. Indeed, the genesis of cellular radio systems can be attributed, in large part, to the desire to overcome these restrictions and to afford the telephone user the freedom to move about or to travel away from his home or office without sacrificing his ability to communicate effectively with others.

In a typical cellular radio system, a metropolitan area is divided into several cells, each of which is served by a base station having a cell controller, a low-powered transmitter and an associated receiver. The user, or the user's vehicle, carries a relatively small, wireless device which communicates with the base station and connects the user to a mobile switching center or exchange. The exchange facilitates communications between the user, other mobile stations in the system and landline parties in the public switched telephone network ("PSTN"). The interconnection of mobile telephone users ("mobile subscribers") with the PSTN requires that each mobile subscriber in the system be made available to anyone who has a telephone, whether fixed or mobile. Hence, the problem of locating a mobile subscriber moving from one area to another (a "roaming subscriber" or "roamer") within a wide geographic area has become of primary importance. A known solution to this problem is based on the concept of mobile registration.

Mobile registration is the process by which a mobile telephone unit becomes listed as being present in the service area of one of the mobile exchanges in a mobile telephone service network. As each mobile telephone unit enters a new area within the network, it transmits a unique identity signal which is detected by the mobile exchange associated with that area. This exchange records an indication of the presence of the mobile subscriber in its memory and then informs all the other exchanges of the presence of the mobile subscriber within its coverage area at that particular moment When the mobile subscriber crosses over into another area, the exchange associated with that area, upon receiving an identity signal from the telephone unit, will record an indication of the mobile subscriber's presence there and then transmit the identity signal to all of the other exchanges together with its own identity signal, for the purpose of updating the mobile subscriber's position.

In other known solutions, a mobile subscriber's identity and position messages are sent by each exchange, whose respective areas are crossed by such mobile subscriber, to a specific center. Any exchange in the mobile network which contacts this center may receive all the information necessary for locating and making a connection to the mobile subscriber. This solution eliminates the need to advise one or more of the other mobile exchanges each time a mobile subscriber enters a new area without making or receiving a call there and thereby reduces the amount of mobile subscriber location data that must be processed by each of the mobile exchanges within the network.

In some systems, the aforementioned center may be a common national center such as that used in the mobile telephone location system disclosed in U.S. Pat. No. 4,700,374 issued to Bini. In other systems, the center may be the exchange to which a mobile subscriber is assigned (the "home exchange"). In such other systems, the mobile subscriber may preregister in an area other than the normal service and billing area (the "home area") for service to be provided in the other area (the "visited area") by the exchange associated with the visited area (the "visited exchange"). When a roaming subscriber arrives in the visited area, the mobile subscriber is qualified to make telephone calls from there and calls which are received in the mobile subscriber's home area are forwarded to the visited area for transmission to the mobile subscriber.

Qualification of a mobile subscriber in a visited area may be automatically performed when the roaming subscriber appears in the visited area and the mobile station is switched on, e g , when the user initiates a first telephone call. The roaming mobile station automatically transmits its identification number to the visited exchange and requests roamer service. If the roaming subscriber is a visitor from a cooperating exchange, the visited exchange provides service to the roaming subscriber by allocating a temporary roamer number to it. The visited exchange also notifies the roaming subscriber's home exchange of the roaming subscriber's location in the coverage area of the visited exchange The roaming subscriber's identification number is then entered into a list of roamers in the home exchange so that incoming calls to the roaming subscriber are forwarded to the visited exchange where the roaming subscriber is then located.

Cellular Privacy

One significant disadvantage of existing cellular radio communication systems is the ease with which analog radio transmissions may be intercepted. In particular, some or all of the communications between the mobile station and the base station may be monitored, without authorization, simply by tuning an appropriate electronic receiver to the frequency or frequencies of the communications. Hence, anyone with access to such a receiver and an interest in eavesdropping can violate the privacy of the communications virtually at will and with total impunity. While there have been efforts to make electronic eavesdropping illegal, the clandestine nature of such activities generally means that most, if not all, instances of eavesdropping will go undetected and, therefore, unpunished and undeterred. The possibility that a competitor or a foe may decide to "tune in" to one's seemingly private telephone conversations has heretofore hindered the proliferation of cellular radio communication systems and, left unchecked, will continue to threaten the viability of such systems for businesses and government applications alike.

It has recently become clear that the cellular radio telecommunications systems of the future will be implemented using digital rather than analog technology. The switch to digital is dictated, primarily, by considerations relating to system speed and capacity. For example, a single analog, or voice, radio frequency (RF) channel can accommodate three (3) to six (6) digital, or data, RF channels. Thus, by digitizing speech prior to transmission over the voice channel, the channel capacity and, consequently the overall system capacity, may be increased dramatically without increasing the bandwidth of the voice channel. As a corollary, the cellular radio system is able to handle a substantially greater number of mobile stations at a significantly lower cost.

Although the switch from analog to digital cellular radio systems ameliorates somewhat the likelihood of breeches in the security of communications between a base station and a mobile station, the risk of electronic eavesdropping is far from eliminated. A digital receiver may be constructed which is capable of decoding the digital signals and generating the original speech. The hardware may be more complicated and the undertaking more expensive than in the case of analog transmission, but the possibility persists that highly personal or sensitive conversations in a digital cellular radio system may be monitored by a third party and potentially used to the detriment of the system users. Moreover, the mere possibility of a third party's eavesdropping on a telephone conversation may eliminate cellular telecommunications as a medium for certain government applications. Certain business users may be equally sensitive to even the possibility of a security breech. Thus, to render cellular systems as viable alternatives to the conventional wireline networks, security of communications must be available on at least some circuits or channels.

Various solutions have been proposed to alleviate the security concerns engendered by radio transmission of confidential data. A known solution, implemented by some existing communication systems, uses cryptoalgorithms to encrypt (scramble) digital data into an unintelligible form prior to transmission. A general discussion of cryptographic systems may be found in the article entitled "Cloak and Data" by Rick Grehan in BYTE Magazine, dated June 1990 at pages 311–324. In most systems currently available, speech is digitized and processed through an encryption device to produce a communications signal that appears to be random or pseudorandom in nature until it is decrypted at an authorized receiver The particular algorithm used by the encryption device may be a proprietary algorithm or an algorithm found in the public domain. Further background for such techniques may be found in the article entitled "The Mathematics of Public-Key Cryptography" by Martin E. Hellman in *Scientific American*, dated August 1979 at 146–167.

One technique for the encryption of data relies on "time-of-day" or "frame number" driven keystream generators to produce keystreams of psuedo-random bits which are combined with the data to be encrypted. Such keystream generators may be synchronized to a time of day counter, i e. hour, minute and second, or to a simple number counter and the encryption and decryption devices may be synchronized by transmitting the current count of the transmitter counter to the receiver in the event one falls out of synchronization with another.

To increase the security of communications in systems utilizing time-of-day or frame number driven keystream generators, the value of each bit in the pseudo-random keystream is preferably made a function of the values of all the key bits in an encryption key In this manner, a person desiring to descramble the encrypted signal must "crack" or "break" all of the bits of the encryption key which may be in the order of fifty (50) to one hundred (100) bits or more. A keystream of this type is generally produced by mathematically expanding the encryption key word in accordance with a selected algorithm which incorporates the count of the time-of-day counter. However, if every bit of the encryption key is to influence every bit in the keystream and if the keystream is to be added to the data stream bits on a one-to-one basis, the required number of key word expansion computations per second is enormous and can readily exceed the real time computational capability of the system. The co-pending application Ser. No. 07/556,358, entitled "Encryption System for Digital Cellular Communications", referred to above, achieves such expansion of the keystream with conventional microprocessors and at conventional microprocessor speeds.

The use of an encryption key to generate a pseudo-random keystream which is a complex function of all the key bits is a very useful tool for securing digital communications Other tools may include arrangements for ensuring that the secret key assigned to each mobile station (the permanent key) is never directly used outside of the home network, i.e., the normal service and billing area of the mobile station. Instead, the permanent key is used to generate other bits (the security key) which are used for enciphering a particular call and which may be transmitted from the home network to a visited network, i.e., an area other than the normal billing area into which the mobile station has roamed. Such arrangements reduce the risk of unauthorized disclosure of the secret key to a third party which may then use the secret key to defeat the encryption process.

Cellular Fraud

Another significant disadvantage of existing cellular radio communication systems has been the widespread fraudulent use of mobile identification numbers ("MINs") to steal cellular service. The past, present and future state of cellular fraud and the resultant revenue and service losses are discussed in the article entitled "Cellular Fraud" by Henry M Kowalczyk in *Cellular Business*, dated March 1991, at 32-35. As stated therein, the earliest form of cellular fraud was roamer fraud in which the MIN of a paying (valid) mobile subscriber was used by a nonsubscriber to qualify for service with a serving switch and to place fraudulent calls from the area served by the switch. Such fraudulent use was often not detected unless and until the billing information was received and questioned by the paying subscriber.

In response to this early and comparatively simple form of roamer fraud, a variety of verification and validation systems were developed and installed. While these systems were somewhat successful in reducing roamer fraud levels to a more acceptable level, they did not eliminate it. Furthermore, recent advances in technology have produced a new and more sophisticated form of fraud known as "ESN tumbling" which takes advantage of certain post-first-call limitations of these systems by changing the electronic serial number ("ESN") of a caller rather than the caller's MIN after placing one or more successful roamer calls with the first ESN. Efforts to combat ESN tumbling through post-first-call validation have, in turn, led to a new fraud technology in which both the MIN and the ESN are tumbled.

Although short-term, piecemeal solutions to the problem of cellular fraud have been developed and implemented, including defaulting all roamers to 0+ dialing and even cancellation of roamer service in some cases, they have not kept pace with the increasing complexity of fraud systems. New and elusive fraud types, such as cloning, whereby a fraudulent user adopts the directory telephone number of a valid subscriber, require long-term solutions which will prevent existing fraud methods and outpace emerging fraud technologies. One such long-term solution is based on the authentication of mobile stations at registration, call initiation or call reception, or during call conversation.

Authentication may be simply viewed as the process of confirming the identity of a mobile station in the network. Both authentication and encryption may require communication between the visited network and the home network, where the mobile station has a permanent registration, in order to obtain mobile-specific information such as the security key used for encryption which is preferably calculated in the home network. The co-pending U.S. patent application Ser. No. 07/556,890, entitled "Authentication System For Digital Cellular Communications", referred to above, discloses an authentication system in which the functions of authentication and encryption can be linked so that a single inter-network transaction establishes both functions. As described in detail therein, the foregoing authentication system achieves such integration by generating, in the same transaction, not only a key-dependent response (RESP) to a random challenge (RAND), but also a security key (S-key) which may be used to encipher user traffic.

As mentioned earlier, a serious problem in existing cellular systems is the fraudulent use of cellular service by invalid or "false" mobile stations. Heretofore, for example, it has been possible to copy the entire memory contents of a mobile station and to manufacture clones which may demand and receive service from the network. One proposed solution is to provide each authorized mobile station with a specific authentication module, or smart card, which has read-only or read-and-write access for the permanent key. This solution, however, renders the mobile station more complex and more expensive. The authentication system described in the co-pending U.S. patent application Ser. No. 07/556,890, entitled "Authentication System For Digital Cellular Communications", includes a "rolling key" (B-key) which affects response (RESP) and provides a more cost effective safeguard against the threat of false mobile stations. In addition, to meet the threat of a "false base station" in the network, the foregoing authentication system includes a bilateral authentication procedure which may be used when the rolling key is updated This two-way authentication procedure enhances security and permits bilateral authentication to be performed, for example, on the dedicated traffic channels of the system at any time during a call Each authentication step may be generally performed at the option of the network operator, but is preferably performed at least once after the active presence of a mobile station is first detected within a network so as to generate an S-key for the first call where encryption is desired.

The rolling key or B-key used to counteract false mobile stations in the network may occasionally fall out of synchronization If the response (RESP) depends on the B-key, and the network and a valid mobile station are using different B-keys, the RESP generated by the mobile station and transmitted to the network will not match the RESP internally generated by the network. The valid mobile station will then appear to the network as a fraudulent mobile station. The system disclosed in the co-pending U.S. patent application entitled "Cellular Verification and Validation System", referred to above, allows the network to distinguish between a valid mobile station using an unsynchronized B-key and a fraudulent mobile station. In addition, the foregoing verification and validation system also allows the network to distinguish between the classical, non-clone, e.g., ESN tumbling, fraudulent users and the more advanced, clone fraudulent users.

While the verification and validation system disclosed in the co-pending U S. patent application entitled "Cellular Verification and Validation System" ameliorates certain effects of B-key asynchronization on the authentication of mobile stations, restoration of B-key synchronization is an essential prerequisite to reaping the full authentication benefits afforded by the use of a changeable B-key. Moreover, the network operator may wish to reset the B-key in both the mobile station and the network to a desired value in any one of a number of circumstances, e.g., at handoff or initial voice channel designation. The present invention provides a mechanism for resetting and resynchronizing the B-key at the network operator's option.

SUMMARY OF THE INVENTION

In one aspect, the present invention includes a method and a system for the resynchronization of a rolling key used as an input among a plurality of inputs to an authentication algorithm executed in a mobile station and in a radio network providing service to the mobile station. According to this aspect of the present invention, the network rolling key input is set to a selected value and the mobile station is commanded to set the mobile station rolling key input to the same selected value. The mobile station will then set the mobile station rolling key input to the selected value in response to the command from the network.

In another aspect, the present invention includes a method and a system for controlling the resetting of a rolling key used in the validation of a mobile station and a serving radio network According to this aspect of the present invention, the current value of the rolling key at a first moment of time is stored in memory and the rolling key is reset to a selected value. The rolling key is reset at a second moment of time to the stored rolling key value in response to an indication of a failure of the rolling key to be updated between the first and second moments of time.

In yet another aspect, the present invention includes a system for the verification and validation of a mobile station and a radio network in accordance with an authentication algorithm executed in each of the mobile station and the network. The mobile station authentication algorithm accepts a plurality of inputs, including a changeable key input stored in a first location in memory and a fixed key input, and generates a plurality of outputs, including a ciphering key output stored in a second location in memory and used to encipher a call, a changeable key output and a network response signal output. According to this aspect of the present invention, a method and a system are provided for linking the resetting of the changeable key input in the mobile station to the validation of the network. The network transmits to the mobile station a signal indicative of a changeable key reset and the mobile station saves the changeable key input value stored in the first location to a third location in memory, and saves the ciphering key output value stored in the second location to a fourth location in memory, in response to the receipt of the changeable key reset signal. The mobile station then sets the changeable key input value stored in the first location to a selected value and executes the mobile station authentication algorithm a first time The mobile station will set the changeable key input value stored in the first location to the value of the changeable key output, and will set the ciphering key output value stored in the second location to the value of the ciphering key output, generated by the first execution of the mobile station authentication algorithm. The network transmits to the mobile station the network response signal generated in the network and the mobile station executes the mobile station authentication algorithm a second time in response to the receipt of the network response signal generated in the network. The mobile station will then compare the network response signal generated by the second execution of the mobile station algorithm with the network response signal generated in the network and also determines whether the network has transmitted to the mobile station a signal indicative of a changeable key update If the network response signal generated by the second execution of the mobile station authentication algorithm matches the network response signal generated in the network and the mobile station has received the changeable key update signal from the network, the mobile station will set the changeable key input value stored in the first location to the value of the changeable key output generated by the second execution of the mobile station authentication algorithm. However, if the network response signal generated by the second execution of the mobile station authentication algorithm does not match the network response signal generated in the network or the mobile station has not received the changeable key update signal from the network, the mobile station will set the changeable key input value stored in the first location to the changeable key input value stored in the third location and set the ciphering key output value stored in the second location to the ciphering key output value stored in the fourth location.

In a further aspect, the present invention includes a method and a system for the resynchronization of a rolling key used as an input to an authentication algorithm which is executed in a mobile station and in a radio network which communicates with the mobile station. According to this aspect, the mobile station and the network maintain a counter value indicative of the number of times the rolling key has been updated. The counter value is incremented each time the rolling key is updated. The mobile station transmits the current counter value in the mobile station to the network and the network will compare the current counter value received from the mobile station with the current counter value in the network. If the current counter value in the network is different from the current counter value received from the mobile station, the network sets the rolling key in the network to the current value of the mobile station rolling key.

BRIEF DESCRIPTION OF THE DRAWINGS

The present invention will be better understood and its numerous objects and advantages will become apparent to those skilled in the art by reference to the following drawings in which.

DETAILED DESCRIPTION

Digital Cellular System

Figure 1:
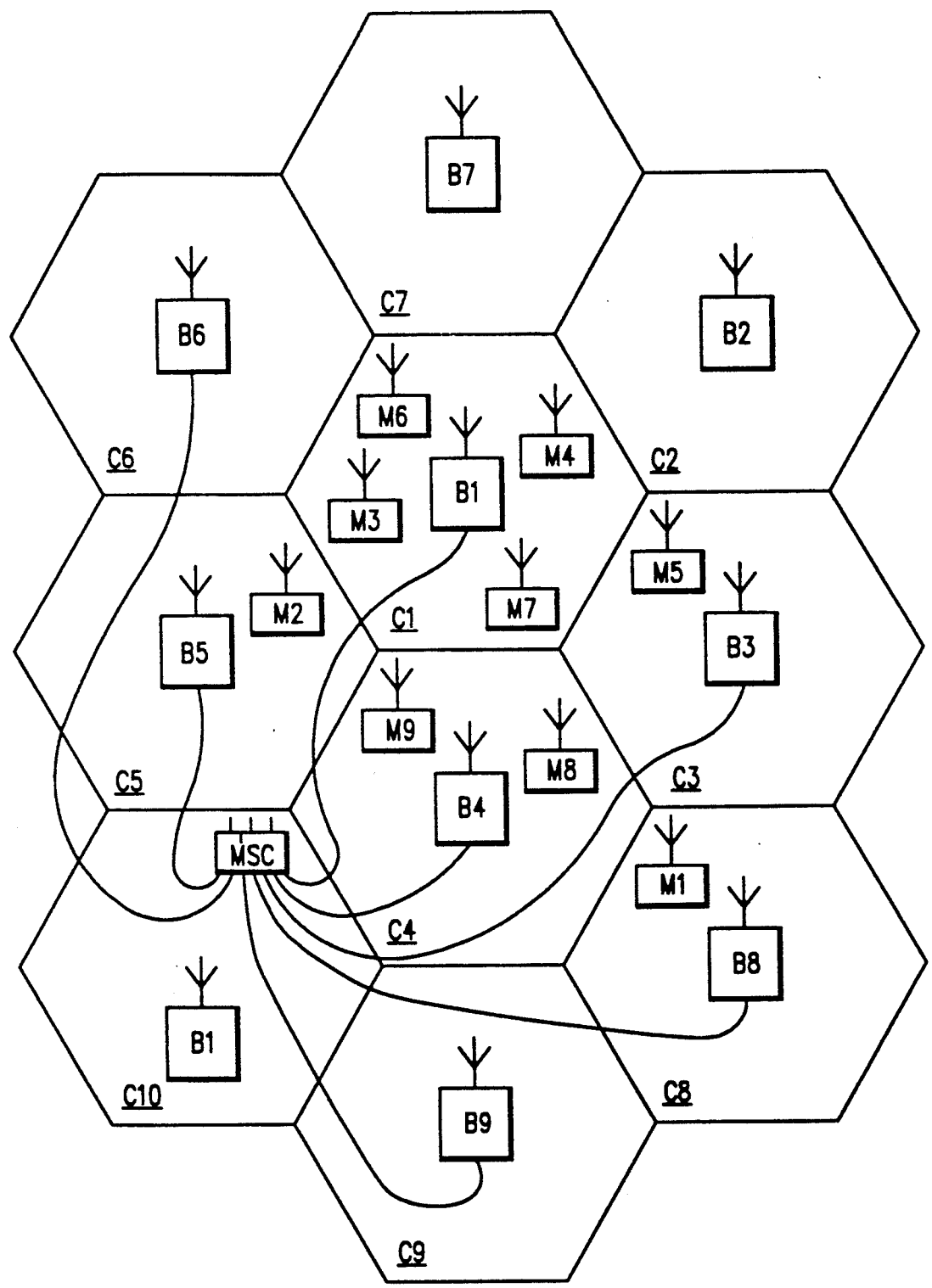
FIG. 1 is a pictorial representation of a cellular radio communications system including a mobile switching center, a plurality of base stations and a plurality of mobile stations.

Referring first to FIG. 1, there is illustrated therein a conventional cellular radio communications system of a type to which the present invention generally pertains. In FIG. 1, an arbitrary geographic area may be seen divided into a plurality of contiguous radio coverage areas, or cells, C1-C10. While the system of FIG. is shown to include only 10 cells, it should be clearly understood that, in practice, the number of cells may be much larger.

Associated with and located within each of the cells C1-C10 is a base station designated as a corresponding one of a plurality of base stations B1-B10. Each of the base stations B1-B10 includes a transmitter, a receiver and controller as is well known in the art. In FIG. 1, the base stations B1-B10 are located at the center of the cells C1-C10, respectively, and are equipped with omni-directional antennas. However, in other configurations of the cellular radio system, the base stations B1-B10 may be located near the periphery, or otherwise away from the centers of the cells C1-C10 and may illuminate the cells C1-C10 with radio signals either omni-directionally or directionally. Therefore, the representation of the cellular radio system of FIG. 1 is for purposes of illustration only and is not intended as a limitation on the possible implementations of the cellular radio system.

With continuing reference to FIG. a plurality of mobile stations M1-M10 may be found within the cells C1-C10. Again, only ten mobile stations are shown in FIG. 1 but it should be understood that the actual number of mobile stations may be much larger in practice and will invariably exceed the number of base stations. Moreover, while none of the mobile stations M1-M10 may be found in some Of the cells C1-C10, the presence or absence of the mobile stations M1-M10 in any particular one of the cells C1-C10 should be understood to depend, in practice, on the individual desires of each of the mobile stations M1-M10 who may roam from one location in a cell to another or from one cell to an adjacent or neighboring cell.

Each of the mobile stations M1-M10 is capable of initiating or receiving a telephone call through one or more of the base stations B1-B10 and a mobile switching center MSC. The mobile switching center MSC is connected by communications links, e.g. cables, to each of the illustrative base stations B1-B10 and to the fixed public switching telephone network (PSTN), not shown, or a similar fixed network which may include an integrated system digital network (ISDN) facility. The relevant connections between the mobile switching center MSC and the base stations B1-B10, or between the mobile switching center MSC and the PSTN or ISDN, are not completely shown in FIG. but are well known to those of ordinary skill in the art. Similarly, it is also known to include more than one mobile switching center in a cellular radio system and to connect each additional mobile switching center to a different group of base stations and to other mobile switching centers via cable or radio links.

Each of the cells C1-C10 is allocated a plurality of voice or speech channels and at least one access or control channel. The control channel is used to control or supervise the operation of mobile stations by means of information transmitted to and received from those units. Such information may include incoming call signals, outgoing call signals, page signals, page response signals, location registration signals, voice channel assignments, maintenance instructions and "handoff" instructions as a mobile station travels out of the radio coverage of one cell and into the radio coverage of another cell. The control or voice channels may operate either in an analog or a digital mode or a combination thereof In the digital mode, analog signals, such as voice or DTMF tone signals, are converted to digital signal representations prior to transmission over the RF channel. Purely data messages, such as those generated by computers or by digitized voice devices, may be formatted and transmitted directly over a digital channel.

Signals from more than one source must normally be sent over a single RF channel in a cellular radio system. The bandwidth of a channel available to carry signals may be allocated by frequency, time intervals or codes. In frequency division multiplexing (FDM), the frequency spectrum represented by the available bandwidth of a channel is divided into smaller bandwidth portions and one of several signal sources is assigned to each portion. Another method for dividing the capacity of a channel among several separate signal sources is time division multiplexing (TDM). In a cellular radio system using TDM, a plurality of digital channels may share a common RF channel. The RF channel is divided into a series of "time slots", each containing a burst of information from a different data source and separated by guard time from one another, and the time slots are grouped into "frames" as is well known in the art. The number of time slots per frame varies depending on the bandwidth of the digital channels sought to be accommodated by the RF channel. The frame may, for example, consist of three (3) time slots, each of which is allocated to a digital channel. Thus, the RF channel will accommodate three digital channels. In one embodiment of the present invention discussed herein, a frame is designated to comprise three time slots. However, the teachings of the present invention should be clearly understood to be equally applicable to a cellular radio system utilizing any number of time slots per frame. Further, the teachings of the present invention are equally applicable to a cellular radio system utilizing frequency division multiplexing (FDM) or code division multiplexing (CDM).

Mobile Station

Figure 2:
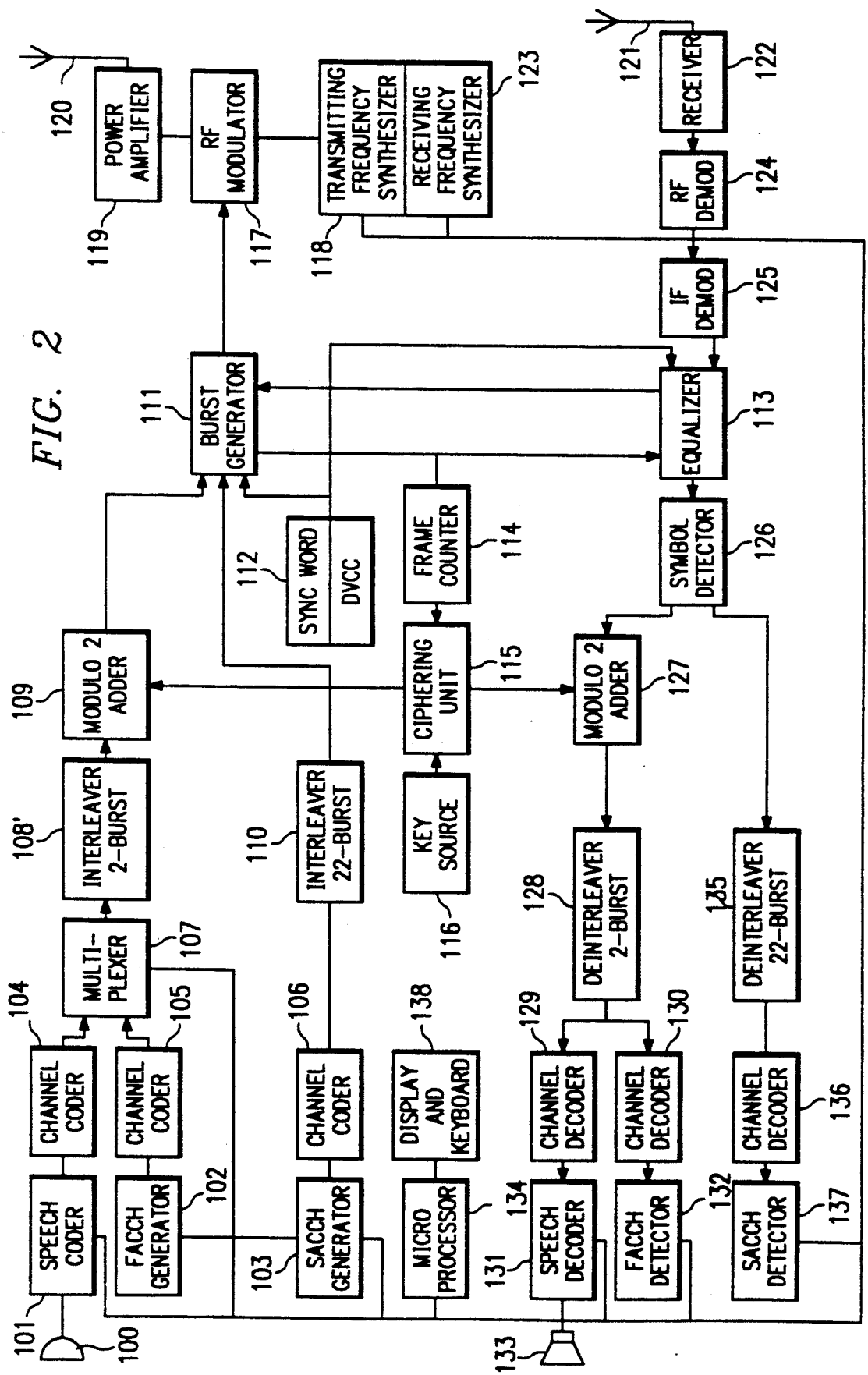
FIG. 2 is a schematic block diagram of mobile station equipment used in accordance with one embodiment of the system of the present invention.

Referring next to FIG. 2, there is shown therein a schematic block diagram of the mobile station equipment which are used in accordance with one embodiment of the present invention. The equipment illustrated in FIG. 2 may be used for communication over digital channels. A voice signal detected by a microphone 100 and destined for transmission by the mobile station is provided as input to a speech coder 101 which converts the analog voice signal into a digital data bit stream. The data bit stream is then divided into data packets or messages in accordance with the time division multiple access (TDMA) technique of digital communications. A fast associated control channel (FACCH) generator 102 exchanges control or supervisory messages with a base station in the cellular radio system. The conventional FACCH generator operates in a "blank and burst" fashion whereby a user frame of data is muted and the control message generated by the FACCH generator 102 is transmitted instead at a fast rate.

In contrast to the blank and burst operation of the FACCH generator 102, a slow associated control channel (SACCH) generator 103 continuously exchanges control messages with the base station. The output of the SACCH generator is assigned a fixed length byte, e.g. 12 bits, and included as a part of each time slot in the message train (frames). Channel coders 104, 105, 106 are connected to the speech coder 101, FACCH generator 102 and SACCH generator 103, respectively Each of the channel coders 104, 105, 106 performs error detection and recovery by manipulating incoming data using the techniques of convolutional encoding, which protects important data bits in the speech code, and cyclic redundancy check (CRC), wherein the most significant bits in the speech coder frame, e.g., 12 bits, are used for computing a 7 bit error check.

Referring again to FIG. 2, the channel coders 104, 105 are connected to a multiplexer 107 which is used for time division multiplexing of the digitized voice messages with the FACCH supervisory messages. The output of the multiplexer 107 is coupled to a 2-burst interleaver 108 which divides each data message to be transmitted by the mobile station (for example, a message containing 260 bits) into two equal but separate parts (each part containing 130 bits) arranged in two consecutive time slots. In this manner, the deteriorative effects of Rayleigh fading may be significantly reduced The output of the 2-burst interleaver 108 is provided as input to a modulo-2 adder 109 where the data to be transmitted is ciphered on a bit-by-bit basis by logical modulo-2 addition with a pseudo-random keystream which may be generated in accordance with the system described in the co-pending U.S. patent application Ser. No. 07/556,358, entitled "Encryption System For Digital Cellular Communications", referred to above.

The output of the channel coder 106 is provided as input to a 110. The 22-burst interleaver 110. The 22-burst interleaver 110 divides the SACCH data into 22 consecutive time slots, each occupied by a byte consisting of 12 bits of control information. The interleaved SACCH data forms one of the inputs to a burst generator 111. Another input to the burst generator 111 is provided by the output of the modulo-2 adder 109 The burst generator 111 produces "message bursts" of data, each consisting of a time slot identifier (TI), a digital verification color code (DVCC), control or supervisory information and the data to be transmitted, as further explained below.

Transmitted in each of the time slots in a frame is a time slot identifier (TI), which is used for time slot identification and receiver synchronization, and a digital verification color code (DVCC), which ensures that the proper RF channel is being decoded. In the exemplary frame of the present invention, a set of three different 28-bit TIs is defined, one for each time slot while an identical 8-bit DVCC is transmitted in each of the three time slots The TI and DVCC are provided in the mobile station by a syno word/DVCC generator 112 connected to the burst generator as shown in FIG. 2. The burst generator 111 combines the outputs of the modulo-2 adder 109, the 22-burst interleaver 110 and the sync word/DVCC generator 112 to produce a series of message bursts, each comprised of data (260 bits), SACCH information (12 bits), TI (28 bits), coded DVCC (12 bits) and 12 delimiter bits for a total of 324 bits which may be integrated according to the time slot format specified by the EIA/TIA IS-54 standard.

Each of the message bursts is transmitted in one of the three time slots included in a frame as discussed hereinabove The burst generator 111 is connected to an equalizer 113 which provides the timing needed to synchronize the transmission of one time slot with the transmission of the other two time slots. The equalizer 113 detects timing signals sent from the base station (master) to the mobile station (slave) and synchronizes the burst generator 111 accordingly. The equalizer 113 may also be used for checking the values of the TI and the DVCC. The burst generator 111 is also connected to a 20ms frame counter 114 which is used to update a ciphering code that is applied by the mobile station every 20ms, i.e., once for every transmitted frame. The ciphering code is generated by a ciphering unit 115 with the use of a mathematical algorithm and under the control of a key 116 which is unique to each mobile station. The algorithm may be used to generate a pseudo-random keystream in accordance with the system described in the co-pending U.S. patent application Ser. No. 07/556,358, entitled "Encryption System For Digital Cellular Communications".

The message bursts produced by the burst generator 110 are provided as input to an RF modulator 117. The RF modulator 117 is used for modulating a carrier frequency according to the $\pi/4$-DQPSK technique ($\pi/4$ shifted, differentially encoded quadrature phase shift key). The use of this technique implies that the information to be transmitted by the mobile station is differentially encoded, i.e., two bit symbols are transmitted as 4 possible changes in phase: + or $\pi/4$ and + or 3 $\pi/4$. The carrier frequency for the selected transmitting channel is supplied to the RF modulator 117 by a transmitting frequency synthesizer 118. The burst modulated carrier signal output of the RF modulator 117 is amplified by a power amplifier 119 and then transmitted to the base station through an antenna 120.

The mobile station receives burst modulated signals from the base station through an antenna 121 connected to a receiver 122. A receiver carrier frequency for the selected receiving channel is generated by a receiving frequency synthesizer 123 and supplied to a an RF demodulator 124. The RF demodulator 124 is used to demodulate the received carrier signal into an intermediate frequency signal. The intermediate frequency signal is then demodulated further by an IF demodulator 125 which recovers the original digital information as it existed prior to $\pi/4$-DQPSK modulation. The digital information is then passed through the equalizer 113 to a symbol detector 126 which converts the two-bit symbol format of the digital data provided by the equalizer 114 to a single bit data stream.

The symbol detector 126 produces two distinct outputs: a first output, comprised of digitized speech data and FACCH data, and a second output, comprised of SACCH data. The first output is supplied to a modulo-2 adder 127 which is connected to a 2-burst deinterleaver 128. The modulo-2 adder 127 is connected to the ciphering unit 115 and is used to decipher the encrypted transmitted data by subtracting on a bit-by-bit basis the same pseudo-random keystream used by the transmitter in the base station to encrypt the data. The modulo-2 adder 127 and the 2-burst deinterleaver 128 reconstruct the speech/FACCH data by assembling and rearranging information derived from two consecutive frames of the digital data. The 2-burst deinterleaver 128 is coupled to two channel decoders 129, 130 which decode the convolutionally encoded speech/FACCH data using the reverse process of coding and check the cyclic redundancy check (CRC) bits to determine if any error has occurred. The channel decoders 129, 130 detect distinctions between the speech data on the one hand, and any FACCH data on the other, and route the speech data and the FACCH data to a speech decoder 131 and an FACCH detector 132, respectively. The speech decoder 131 processes the speech data supplied by the channel decoder 129 in accordance with a speech coder algorithm, e.g. VSELP, and generates an analog signal representative of the speech signal transmitted by the base station and received by the mobile station. A filtering technique may then be used to enhance the quality of the analog signal prior to broadcast by a speaker 133. Any FACCH messages detected by the FACCH detector 132 are forwarded to a microprocessor 134.

The second output of the symbol detector 126 (SACCH data) is supplied to a 22-burst deinterleaver 135. The 22-burst interleaver 135 reassembles and rearranges the SACCH data which is spread over 22 consecutive frames. The output of the 22-burst deinterleaver 135 is provided as input to a channel decoder 136. SACCH messages are detected by an SACCH detector 137 and the control information is transferred to the microprocessor 134.

The microprocessor 134 controls the activities of the mobile station and communications between the mobile station and the base station Decisions are made by the microprocessor 134 in accordance with messages received from the base station and measurements performed by the mobile station. The microprocessor 134 is also provided with a terminal keyboard input and display output unit 138. The keyboard and display unit 138 allows the mobile station user to exchange information with the base station.

Base Station

Figure 3:
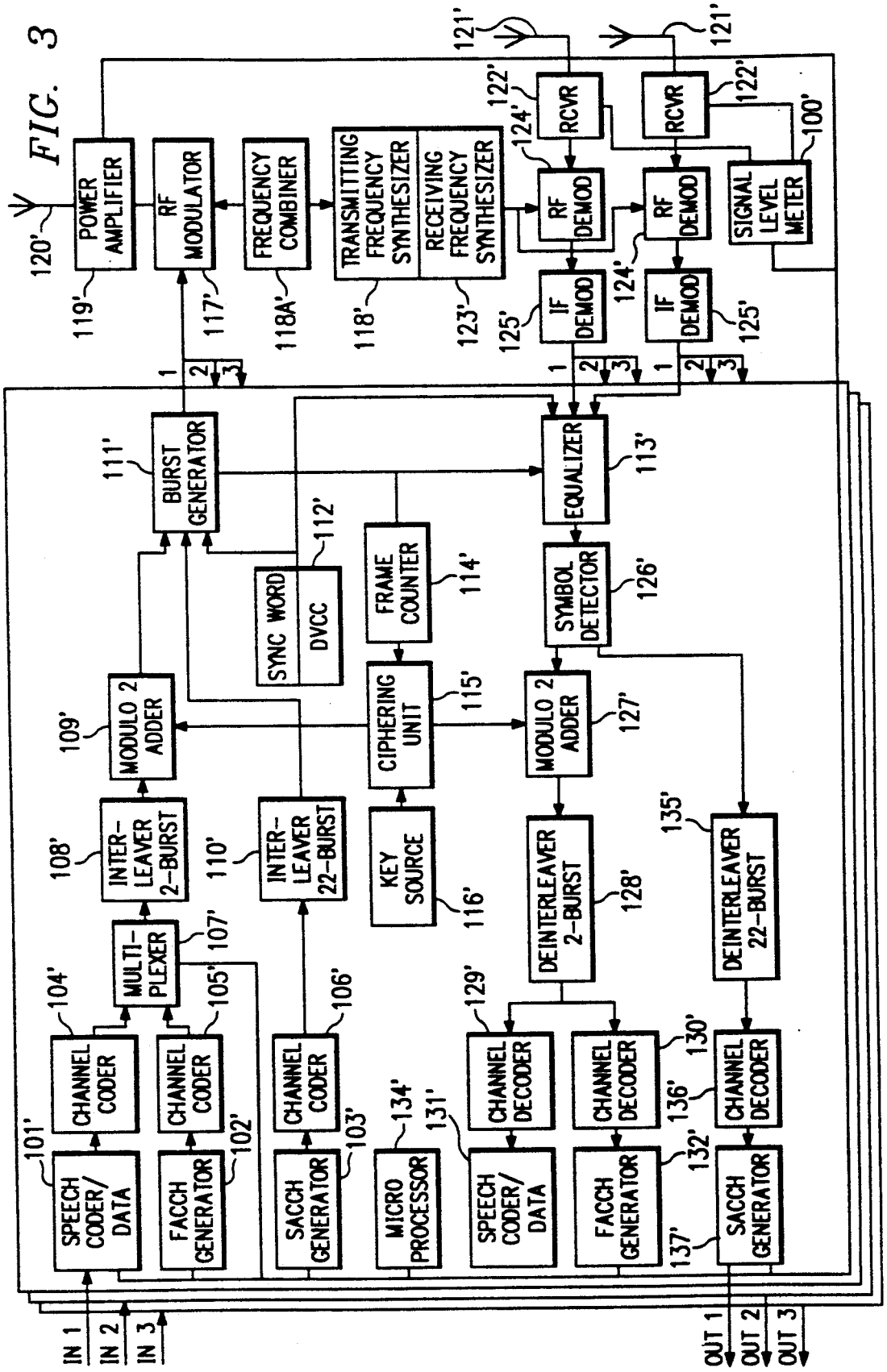
FIG. 3 is a schematic block diagram of base station equipment used in accordance with one embodiment of the system of the present invention.

Referring next to FIG. 3, there is shown a schematic block diagram of the base station equipment which are used in accordance with one embodiment of the present invention. A comparison of the mobile station equipment shown in FIG. 2 with the base station equipment shown in FIG. 3 demonstrates that much of the equipment used by the mobile station and the base station are substantially identical in construction and function. Such identical equipment are, for the sake of convenience and consistency, designated with the same reference numerals in FIG. 3 as those used in connection with FIG. 2, but are differentiated by the addition of a prime (') in FIG. 3.

There are, however, some minor differences between the mobile station and the base station equipment. For instance, the base station has, not just one but, two receiving antennas 121'. Associated with each of the receiving antennas 121' are a receiver 122', an RF demodulator 124', and an IF demodulator 125'. Furthermore, the base station includes a programmable frequency combiner 118A' which is connected to a transmitting frequency synthesizer 118'. The frequency combiner 118A' and the transmitting frequency synthesizer 118' carry out the selection of the RF channels to be used by the base station according to the applicable cellular frequency reuse plan. The base station, however, does not include a user keyboard and display unit similar to the user keyboard and display unit 138 present in the mobile station. It does however include a signal level meter 100' connected to measure the signal received from each of the two receivers 122' and to provide an output to the microprocessor 134'. Other differences in equipment between the mobile station the base station may exist which are well known in the art.

Definition of Network

Having described an operating environment consisting of a cellular radio network including mobile stations and base stations, the verification and validation system of the present invention will be set forth below in detail. For purposes of the following discussion, the term network shall be construed broadly in light of the following observations.

Unless the context otherwise requires, the term "network" as used hereinafter includes a single base station having a limited radio coverage area and associated with an exchange in a cellular radio communications system. Hence, the term "home network" as used hereinafter includes a base station associated with the home exchange while the term "visited network" as used hereinafter includes a base station associated with the visited exchange. Furthermore, in certain occurrences herein, the term "network" may refer, alternatively, to either the home network or the visited network or, collectively, to both the home network and the visited network.

Although most cellular radio networks today operate in an exchange environment wherein location and service profile data for each mobile subscriber are stored in his or her home exchange and updated from time to time as required, implementation of a location register environment, either exclusively or in conjunction with an exchange environment, in cellular radio networks is expected to become widespread in the future. In a location register environment, location and service profile data for a large number of mobile subscribers are recorded and updated in a home location register (HLR) which is connected, and may serve the mobile subscribers assigned, to several different home exchanges. In this aspect, the HLR performs some of the functions traditionally reserved for the home exchanges in the cellular radio network. Unlike a home exchange, however, the HLR has no voice transmission, reception or switching facilities, but is essentially a database from and to which information can be read and written. Possible reasons for a shift from an exchange environment to a location register environment include limitations in the capacity of an exchange and optimization of administrative procedures for handling calls. For example, while only 64,000 mobile subscribers may be connected to a typical exchange at one time, a location register may have the capacity to serve over 500,000 mobile subscribers.

Consistent with the present invention, the "network" referred to hereinafter, may use a home location register (HLR) where each of many mobile subscribers is assigned a permanent user identity and where mobile-specific information, such as location or service profile data or security keys, is recorded and updated. The network may also use a visitor location register (VLR) to retrieve information on, for example, the handling of calls to or from a visiting (roaming) subscriber.

Authentication

Figure 4:
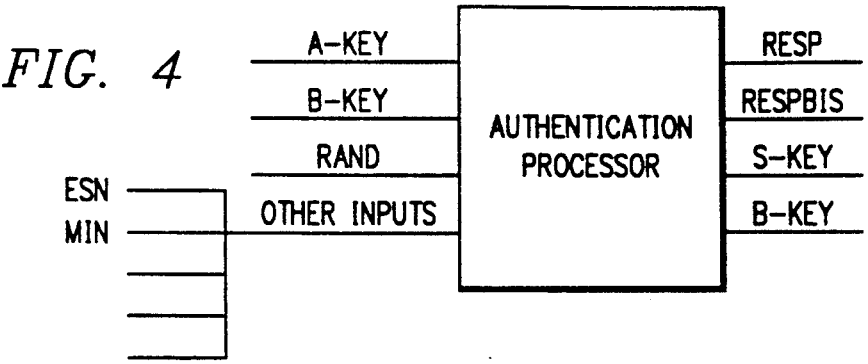
FIG. 4 is a pictorial representation of an authentication system which may be used for both unilateral and bilateral authentication.

Referring now to FIG. 4, a pictorial representation of an authentication system having a plurality of inputs applied to an algorithm and a plurality of outputs generated by the algorithm may now be seen. The depiction in FIG. 4 will form the basis for the ensuing discussion of both unilateral (mobile station) and bilateral (mobile station and base station) authentication which, for convenience and simplicity, are assumed to be executed by the authentication system with the use of one authentication algorithm referred to hereinafter as AUTH In other words, it is assumed for purposes of the following discussion that the same authentication algorithm (AUTH) is used in generating the outputs needed for unilateral and bilateral authentication. Conceivably, a different algorithm may be used for unilateral authentication than for bilateral authentication so long as the same unilateral and bilateral authentication algorithms are used by both the mobile station and the network. The particular choice and specific details of the authentication algorithm(s), however, are not critical aspects of the present invention and reference is hereby made to U.S. patent application Ser. No. 07/556,890, entitled "Authentication System For Digital Cellular Communications", which sets forth an exemplary authentication algorithm, as maybe useful for a more complete understanding of the present invention.

Unilateral Authentication

To perform the process of unilateral authentication, i.e., authentication of the mobile station, the network determines and broadcasts to the mobile station a random challenge number ("RAND") contained, for example, in a random challenge global action message periodically appended to the overhead message train. The mobile station stores the value of the RAND in memory and identifies itself to the network by sending a mobile identification number (MIN) derived, for example, from the mobile station's 10-digit directory telephone number (area code and telephone number), so that the network can retrieve information pertaining to that particular mobile station, e.g., security keys, from the location or database in which they are stored. The mobile station and the network each uses bits of the RAND, a permanent key (A-key), which is a secret key known only to the mobile station and the network and preferably never transmitted over the air interface, and other inputs including, for example, the factory-set electronic serial number (ESN) which uniquely identifies the mobile station, and, possibly also, the MIN of the mobile station, to compute both a response (RESP) to the RAND and a short-term or temporary encryption key (S-key or call variable) in accordance with a preselected authentication algorithm (AUTH). The RESP generated at the mobile station is transmitted to the network where it is compared with the internally generated version and, if a match is found, the network may grant the mobile station access for registration or initiation or reception of a call. The S-key can be used to encipher subsequent calls placed to and from the mobile station.

RAND

The RAND used for unilateral authentication (discussed above) is a "global" RAND which is determined by, for example, the visited network and sent to all mobile stations in the coverage area of the visited network. By contrast, the RAND used for bilateral authentication (discussed below), is a "mobile-specific" RAND which is determined by, for example, the home network and sent to a particular mobile station in the coverage area of a visited network. The specific choices between global and mobile-specific, and between home network and visited network, RANDs made herein are for illustration purposes only and are not intended as a limitation on the present invention. Similarly, the particular type of communications channel, e.g., voice or control, used for transmitting the RAND to the mobile station is an implementation issue for network operators. It will be appreciated by those of ordinary skill in the art, however, that the common control channel is especially suited for global RAND transmission while the mobile-specific RAND may be advantageously transmitted over the voice or speech channel.

Secret Keys Management

Another implementation issue for network operators is secret keys management Secret keys, such as the A-key (and the B-key discussed below), must be stored in a convenient location from which they can be readily accessed. The particular network location selected for storage of the secret keys has certain operational ramifications which are not of immediate significance to the present invention. It should be noted, however, that inter-network communications are simplified and security is enhanced if the secret keys, e.g., the A-key (and the B-key), are stored in the home network, or at least in a location under the control of the home network, so that only security variables, e.g., S-key, are transmitted between the home network and a visited network. In parts of the remaining discussion, it is assumed that the secret keys are stored in, or controlled by, the home network of the mobile station.

The issue of secret keys management arises in connection with the mobile station as well. The mobile station may, for example, store all the secret keys, e.g., A-key and B-key, in an internal memory device. Alternatively, each mobile subscriber may carry a subscriber identity module (SIM), e g , smart card, which contains the secret keys and which may be connected to the mobile station memory. In some applications, the mobile station may store one of the secret keys in internal memory and the other key may be stored in the SIM. It should be clearly understood that the question of secret keys management, whether as to the network or the mobile station, is ancillary to the present invention as set forth herein.

Location of AUTH

Yet another implementation issue for network operators is the network location for execution of AUTH. If AUTH is executed in the home network, the visited network must transmit at least MIN and global RAND to the home network in order to receive the RESP and S-key. On the other hand, if AUTH is executed in the visited network, that network must transmit at least MIN to the home network and the home network must, in turn, transmit to the visited network the A-key, the ESN (if ESN is used in AUTH) and the permanent encryption key (if different from the A-key).

From a security standpoint, however, it is undesirable for the home network to release a subscriber's permanent security key merely on demand by a visited network. Such keys should constitute the subscriber's long-term security guarantee rather than a short-term call variable. It is, therefore, more desirable that the home network, upon receiving from the visited network the MIN of a visiting mobile station, the RAND broadcast by the visited network and the RESP received by the visited network from the mobile station, generate a short-term (temporary) ciphering key (S-key or call variable) and release the S-key to the visited network only if the RESP is deemed to be valid.

Call Variable or S-Key

Execution of the authentication algorithm in the home network allows the authentication algorithm (AUTH) to safely use the long-term (permanent) secret key, referred to herein as the A-key, which is unique to each mobile station. The A-key is preferably never released outside the home network and never used directly for enciphering but is, instead, used for generating a short-term encryption key, referred to herein as the S-key The S-key is used only for a limited period of time to be determined by the cellular operator. If, for example, the visited network has already acquired an S-key for a previously registered visiting (roaming) mobile station, performance of authentication is optional and call set-up may proceed directly to the enciphered traffic channel Hence, it is not necessary for inter-network exchanges to take place every time a visiting mobile station places a call. If, on the other hand, the visited network decides to request an authentication on the traffic channel, for example, the mobile station and the home network may use the current RAND of the visited network to generate a new S-key, other inputs to the AUTH algorithm being unchanged.

Rolling Key or B-key

A valid mobile station may be borrowed, stolen or legally acquired and its entire memory contents may be copied, including its ESN, secret keys, e.g., A-key, etc., and used to manufacture a number of clones which produce authentication responses that are identical to those of the valid mobile station. The cloning procedure may be quite sophisticated and may include software modifications which replace physically stored ESN information with electronically stored information so that a number of stored mobile station identities may by cyclically rotated (tumbled) within one false mobile station and used to imitate several genuine mobile stations. The authentication system of FIG. 4 provides an anti-cloning safeguard based on a dynamic, i.e., changeable, "rolling key" which is stored in each of the home network and the mobile station and which is used along with the permanent secret key (A-key) for calculating authentication responses, temporary encryption keys and new rolling keys.

The principle behind the rolling key concept is to require certain historical information in each of the network and the mobile station to match as a means of protection against clones and as an alternative to requiring complex and expensive physical protection of mobile station memories. Specifically, in order for a clone mobile station to gain access to the network, the clone would be required to intercept the entire history of authentication challenges subsequent to the time of copying the then current key state of a genuine mobile station. Because each authentication may change the value of the rolling key (B-key), the key-dependent responses generated by a valid and a clone mobile station, which have identical memory contents, e.g., A-key and B-key, at the time of copying but different authentication histories, e.g., B-keys, at some future point, will begin to diverge from each other and from the responses internally generated by the network thereby alerting the network to the existence of the clone. In the absence of a rolling key, a clone which has copied the A-key will always produce the same response as the valid mobile station and may thus escape detection.

Consistent with the present invention, authentication may be carried out in the home network using a combination of a rolling key, referred to herein as the B-key, which contains historical information, and the permanent mobile subscriber key (A-key), which is used for generating one or more operating keys, e g , S-keys and B-keys. The AUTH computes a new value for the rolling key which becomes the current value of the rolling key whenever the mobile station and the home network agree on an update Such an update may be triggered, for example, by a request from the visited network or the home network for execution of a bilateral authentication procedure as further described below.

Bilateral Authentication

Bilateral authentication, i.e., authentication of both the mobile station and the network, may be distinguished from unilateral authentication in that the authentication information sent in both directions is key-dependent in the former, whereas only the information sent in the direction mobile station to network is key-dependent in the latter. According to FIG. 4, the RAND is used as an input to AUTH which generates a long response comprised of a RESP and a RESPBIS The RESP is sent by the mobile station to the network to validate the mobile station and the RESPBIS is sent from the network to the mobile station to validate the network. The network transmits to the mobile station an authentication order or message which includes the RAND and the RESPBIS. The mobile station uses the RAND to compute a RESP and a RESPBIS in accordance with the AUTH and sends a bilateral authentication response message containing the internally generated RESP to the network only if the internally generated RESPBIS matches the RESPBIS received from the network Otherwise, i e., if the internally generated RESPBIS does not match the RESPBIS received from the network, the mobile station does not send the bilateral authentication response message to the network, but sends, instead, an acknowledgement (ACK) message confirming receipt of the authentication order from the network. This prevents a false base station from extracting from a valid mobile station a bank of RAND, RESP pairs which may then be used by a fraudulent mobile station to gain access to the network. Moreover, the verification of the mobile station and network identities allows security status updating to proceed at a convenient later point in relative safety.

B-key Step

The primary and dual functions of bilateral authentication are to trigger a rolling key (B-key) update in both the mobile station and the home network while, at the same time, validating them to each other and, thus, preventing certain forms of false base station attacks on the security of the system. The former function, i.e., B-key update, may be separated from the latter function, i.e., reciprocal validation, by the use of a B-key step flag which may be contained in any given order or message sent from the network to the mobile station. The B-key step flag allows the network operator to selectively control, e g , enable or disable, the updating of the B-key (and S-key) and may consist, for example, of a designated binary bit (1 or 0 value) contained in the bilateral authentication order or message sent from the network to the mobile station. The newly calculated B-key and S-key outputs of AUTH are designated by the mobile station as the new B-key for the next authentication and the new S-key for the next call, respectively, only if the internally generated RESPBIS matches the RESPBIS received from the network and the B-key step flag is active, i.e., value set to 1. If the B-key step flag is inactive, i.e., value set to 0, the current B-key is saved and used for the next authentication and the current S-key is saved and used to cipher the next call.

It will be appreciated by those of ordinary skill in the art that stepping (updating, changing, rolling) of the B-key is not necessarily linked, and may thus be performed, independently of the execution of either unilateral or bilateral authentication. For example, at any given moment during a call, the network may activate the B-key step flag in a message sent to the mobile station. Upon detecting that the B-key step flag has been activated by the network, the mobile station will execute AUTH and replace the current value of its B-key with the new B-key value generated by AUTH. The mobile station may then send an acknowledgement (ACK) message to the network confirming that the mobile station has updated its B-key. Upon receiving the ACK message, the network will replace the current value of its B-key with the new B-key value generated by the execution of AUTH in the network.

Exemplary Authentications

In a typical bilateral authentication, the RAND value is determined by the home network and sent along with a RESPBIS to the visited network and, therefrom, to the mobile station. If the mobile station validates the RESPBIS, the mobile station will send a RESP to the visited network which sends the RESP to the home network for validation. The home network compares the RESP received from the visited network with the internally generated RESP and informs the visited network of the result. If the home network validates the RESP, the visited network will grant access to the mobile station Further, if encryption is desired and the B-key step flag is active, the home network will send to the visited network a new S-key which may be used to encipher the next call.

Alternatively, and to minimize the extent of inter-network communications in the performance of bilateral authentication, the home network may initially send not only the RAND and RESPBIS, but also the RESP, S-key and B-key step flag value to the visited network which may then transmit the RAND, RESPBIS and B-key step flag value to the mobile station and use the RESP and S-key received from the home network to, respectively, validate the RESP received from the mobile station where RESPBIS is validated and encipher subsequent calls where encryption is desired If the RESPBIS is validated by the mobile station and the B-key step flag is active, i e., value set to 1, the mobile station will calculate a new S-key for the next call and a new B-key for the next authentication and send RESP to the visited network. The visited network may then inform the home network that the mobile station has updated the B-key Furthermore, in certain applications, the home network may send not only one but a plurality of successive sets of security variables, e.g., RAND, RESP, RESPBIS, S-key and B-key step flag values, to the visited network for use in a plurality of successive instances of authentication and/or encryption Assume, for example, that the visited network has sent a unilateral authentication order (global RAND) on the analog control channel (ACC) to all mobile stations within its coverage area. Each of the mobile stations uses the global RAND received from the visited network to compute a RESP which is sent back to the visited network The visited network, in turn, sends the global RAND and the RESP received from the mobile station to the home network of the mobile station The home network uses the global RAND received from the visited network and the secret keys assigned to the mobile station to calculate a RESP which is compared with the RESP computed by the mobile station and relayed from the visited network to the home network As discussed hereinafter, the RESP calculated in each of the mobile station and the home network may include a first response portion RESP-A, which is dependent on the A-key but not the B-key, and a second response portion RESP-AB, which is dependent on both the A-key and the B-key. By comparing the RESP-A portion of the RESP, the home network can distinguish between a valid mobile station and a non-clone fraudulent user even where the B-key has fallen out of synchronization. If RESP-A matches but RESP-AB does not match, resynchronization of the B-key may be necessary and the home network may request the visited network to perform a B-key reset in the manner discussed hereinafter. The home network releases or sends to the visited network a bank of security variables, e.g., mobile-specific RAND, RESP, RESPBIS, S-key (if encryption is enabled for the mobile station), B-key step flag values, and (if necessary) an indication to the visited network to order the mobile station to reset the B-key.

Thus, in the aforementioned applications, the home network initially uses a global RAND to validate RESP and releases, at once, several mobile-specific RANDs and S-keys to the visited network, which successively uses each of the mobile-specific RANDs and each of the S-keys to validate RESP in subsequent authentications and to encipher subsequent calls, respectively, even though it is generally more desirable, from a security standpoint, that the home network release one S-key at a time and only after an authentication of the mobile station by the home network (and not the visited network) as illustrated above for the typical bilateral authentication.

It will be appreciated that the release by the home network, and/or the use by the visited network, of one or more S-keys may not be necessary or may be optional where encryption is not enabled for the mobile station or where the visited network assigns the mobile station to the analog voice channel (AVC). If an S-key is nevertheless sent by the home network to the visited network in such instances, the visited network may interpret the receipt of an S-key as an implicit indication of an authentication of the mobile station by the home network.

Call Counter

In addition to an authentication system for performing unilateral and bilateral authentication, the home network and the mobile station may include a call counter for tracking the number of calls to and from the mobile station. Unlike the authentication system which is aimed at controlling fraud, the call counter is directed to monitoring or supervising the fraudulent use of network services. The call counter in the mobile station may be updated or incremented upon receipt of a call counter update message transmitted from the network to the mobile station. Similarly, the current value of the call counter in the mobile station may be sent to the network in a call counter retrieval message upon receipt of a request for the mobile station call counter value from the network.

To monitor fraudulent use, the network may compare the current value of the call counter received from the mobile station with the current value of the call counter in the network. Moreover, by examining the description and the sequence or logical progression of calls appearing in a mobile subscriber's bill, the mobile subscriber may be alerted to the existence of a fraudulent user which has, for example, stolen the MIN/ESN belonging to that mobile subscriber. In this respect, the call counter may be regarded as an independent fraud supervision means, distinct from the authentication system, e.g., there is no inherent linkage between the authentication messages and the call counter messages. A different counter, however, may be linked to authentication and updated at the same time as the rolling key as described immediately below.

B-key Index

The home network and the mobile station may include a B-key index counter which is incremented every time the network and the mobile station update the rolling key, e.g., successfully execute bilateral authentication with the B-key step flag activated. The rolling key update may be performed at any time during a conversation that, for example, the home network decides to update the B-key and the B-key index counter in the home network and the mobile station. Before updating its B-key and B-key index counter, the home network may request execution of bilateral authentication by the mobile station and the visited network. Receipt by the home network of a correct response from the mobile station would then result in a B-key index counter update, a rolling key update and, possibly also, the generation of a new conversation key (S-key) which is sent to the visited network for use in subsequent calls. Similarly, the mobile station may update its B-key index counter only if the bilateral authentication procedure verifies that the visited network is in contact with the genuine home network. Upon verification, the mobile station updates its B-key index counter and rolling key (B-key) and may also generate a new conversation key (S-key) for use in subsequent calls.

It may be appreciated that, because the B-key index counter and the rolling key are updated at the same time, a comparison of the mobile station and the home network B-key index counters may also serve as an indication of whether the mobile station and home network are in the same rolling key state. The current value of the B-key index in the mobile station may be automatically sent from the mobile station to the visited network when the mobile station requests service from the visited network or at the beginning of a call in an authentication response message to a global RAND transmitted by the visited network over the control channel, or during the call in a status message sent as a reply to a status request message transmitted by the visited network over the voice channel. The status message may also include other information such as the current value of the call counter in the mobile station. The visited network may, in turn, send the current values of the mobile station call and B-key index counters to the home network for comparison. If, for example, the current value of the mobile station B-key index is different from the current value of the B-key index in the home network, the home network may set the current B-key value in the home network equal to the value of the mobile station B-key corresponding to the current value of the mobile station B-key index.

Relationship Between Encryption and Authentication

When enciphering of communication is desired in a visited network the ciphering key must be communicated from the home network to the visited network. As mentioned heretofore, it is highly undesirable for the secret subscriber A-keys to circulate between networks on non-specially protected links. Preferably, the home network never releases the A-key of a given subscriber but only uses the A-key to generate a temporary talk-variable (S-key) which is then used for enciphering a particular call or group of calls. The S-key is calculated and sent from the home network to the visited network upon receiving a MIN, a RAND and a RESP which is deemed valid. Since the S-key is calculated at the same time and by the same process as the RESP, successful authentication generally ensures that the network and the mobile station will have the same enciphering key (S-key) and, consequently, the enciphering of traffic or user data may begin as soon as authentication has been completed.

To illustrate the relationship between encryption and authentication, assume that encryption is enabled for a mobile station served by a visited network. The visited network periodically broadcasts a new RAND value to all mobile stations within its service area. Each of the mobile stations computes a response (RESP) which is sent along with MIN and, possibly, a call history parameter COUNT to the visited network. The visited network sends the current RAND value along with the MIN and RESP received from a particular mobile station to, and requests the enciphering key (S-key) from, the mobile station's home network. The home network compares the received RESP with the response it has obtained by applying RAND, A-key, B-key and ESN, for example, to AUTH and determines whether the mobile station is genuine whereupon the home network releases the temporary enciphering key (S-key) to the visited network. If the visited network does not receive an enciphering key, the visited network may deny service to the mobile station.

If the visited network grants access and assigns a TDMA channel to the mobile station, the parameters defining that channel, i e., frequency, time slot and DVCC, are sent from the visited network to the mobile station which tunes to the allocated traffic channel Thereafter, the visited network and the mobile station may communicate in the enciphered mode using the S-key. The visited network may send its frame counter value over the unencrypted SACCH and may also send frame count synchronization messages in a number of FACCH messages as described in the co-pending patent application Ser. No. 07/556,102 entitled "Continuous Cipher Synchronization for Cellular Communication System", referred to above. Further exchanges of FACCH signalling or traffic take place in the enciphered mode.

Once the mobile station and the visited network have established communication on the traffic channel, the visited network may, at any time, request the execution of bilateral authentication and rolling key and B-key index counter update by sending to the mobile station a RAND and a RESPBIS received from the home network and activating the B-key step flag. The mobile station uses the RAND, ESN, A-key and B-key in AUTH to generate the expected RESP and RESPBIS. IF the internally generated RESPBIS agrees with the received RESPBIS, the mobile station sends the RESP to the visited network. The visited network sends RESP to the home network and, if the home network's internally generated RESP agrees with the received RESP, a newly calculated call variable or S-key may be sent from the home network to the visited network. The visited network stores the new S-key for use in future calls involving the visiting mobile station. The present call continues to be enciphered with the old S-key. Upon handoff or call termination, the new S-key may come into use.

Asynchronism of Rolling Key or B-key

Authentication of a valid (non-fraudulent) mobile station in accordance with FIG. 4 requires that the same B-key input be used by both the mobile station and the network to generate the corresponding values of the RESP. For a variety of reasons, however, the B-key used by the valid mobile station may fall out of synchronization with the B-key used by the network. In the execution of bilateral authentication, for example, the RAND and RESPBIS generated by the network may be lost during transmission and never received by the mobile station which, therefore, fails to perform a B-key update. Furthermore, because the B-key, unlike the A-key, is not fixed or "hardwired," but is instead a changeable content of an electronic circuit, a variety of hardware-related problems, such as electro-magnetic interference, switch failure, etc., may damage or completely destroy the value of the B-key in either the mobile station or the network leading to a loss of B-key synchronization between them.

Where technical difficulties cause asynchronization of the B-key between the mobile station and the network, the RESP of a valid mobile station will not match the RESP generated by the network and the authentication will fail even though the mobile station is not fraudulent. A mechanism is, therefore, needed to distinguish between a fraudulent mobile station and, for example, a valid but malfunctioning mobile station or, more generally, a valid mobile station using a B-key which, for one reason or another, has deviated from the B-key used by the network in the authentication of the mobile station.

Partitioning of RESP

Figure 5:
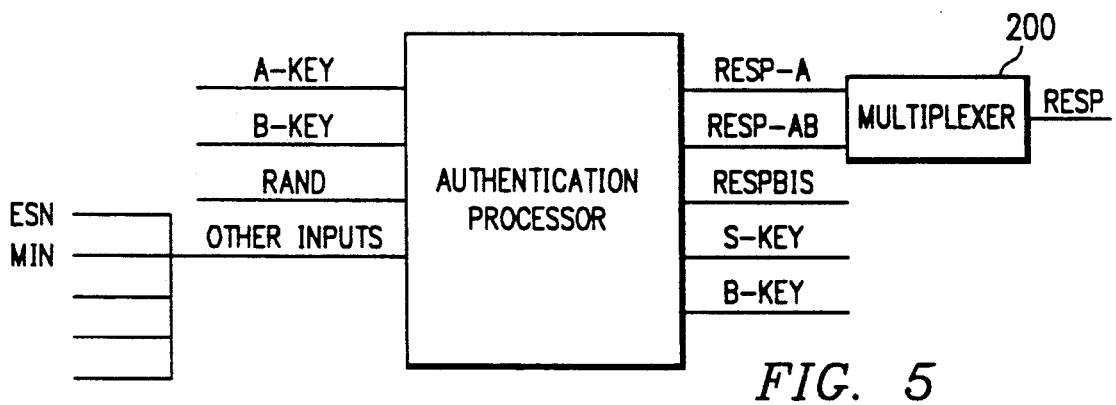
FIG. 5 is a pictorial representation of an authentication system constructed in accordance with one embodiment of the present invention.

Referring now to FIG. 5, an authentication system constructed in accordance with one embodiment of the present invention may now be seen. The inputs to and outputs from the authentication system of FIG. 5 are similar to those of the authentication system pictured in FIG. 4, except that, unlike the response in FIG. 4 which is dependent on both the A-key and the B-key (and the other inputs, if any), the response in FIG. 5 has been divided into a first response portion RESP-A, which is dependent on the fixed A-key (and the other inputs, if any) but not the changeable B-key, and a second response portion RESP-AB, which is dependent on the B-key but not the A-key or, preferably, on both the A-key and the B-key (and the other inputs, if any). The RESP-A and RESP-AB may be sent in the form of discrete responses from the mobile station to the network or may be combined, e.g., multiplexed in a multiplexer 200, to form the total response (RESP) which is sent from the mobile station to the network. In either event, since RESP-A is independent of the B-key, the network can authenticate a valid mobile station even if the B-key used by the valid mobile station has fallen out of synchronization with the B-key used by the network. In such instance, although the RESP-AB transmitted by the mobile station will not match the RESP-AB internally generated by the network, there will, nevertheless, be a match of the RESP-A and the authentication will succeed despite the onset of B-key asynchronization.

The virtues of the partitioning of RESP may be further illustrated by considering the authentication possibilities in the absence and then presence of RESP partitioning. Without RESP partitioning, the comparison of responses by the network will produce either a full match or a total mismatch (no-match) In the case of a valid mobile station using a damaged, malfunctioning or otherwise unsynchronized B-key, the comparison of responses by the network will yield a no-match and may result in denial of service to the valid mobile station since the network cannot distinguish between a malfunctioning valid mobile station and a fraudulent mobile station using, for example, ESN tumbling. With RESP partitioning, however, there is the additional possibility of recognizing at least a partial (RESP-A) match between the responses compared by the network where B-key asynchronization has occurred. Moreover, RESP partitioning allows the network to distinguish between traditional fraudulent users which rely, for example, on the tumbling of MIN/ESN or similar non-cloning techniques, and produce no-match responses, and advanced fraudulent users or clones which rely, instead, on the copying of the memory contents, including the A-key and B-key, of a valid mobile station and produce partial match or full match responses. In effect, the authentication system of FIG. 5 provides either a full authentication or a partial or limited authentication of the mobile station. The possible outcomes for the comparison of responses generated according to FIG. 5 and some typical reasons (sources) therefor are listed below:

1. No-match: a fraudulent mobile station using ESN tumbling or other non-cloning fraudulent techniques.
2. Partial match:
   (a) a valid mobile station using a damaged, malfunctioning or otherwise unsynchronized B-key.
   (b) a clone after the valid mobile station has performed a B-key update (through bilateral authentication, for example).
   (c) a valid mobile station after a clone has performed a B-key update.
3. Full match:
   (a) a valid mobile station using a synchronized B-key.
   (b) a clone where no B-key updating has theretofore been performed.
   (c) a clone where the B-key of the valid mobile station has not been updated since the cloning process.

As will be understood from the above listing and prior discussion, by comparing the RESP-A portion of the response (RESP), the network can distinguish between a valid mobile station and a non-clone (ESN tumbling, etc.) fraudulent user even where the B-key is out of synchronization. In addition, by comparing the RESP-AB portion of the response, the network can detect that a clone exists and take corrective action as necessary. It should also be clear from the foregoing that RESP-A and RESP-AB may be calculated in various ways and later combined to form the composite RESP so long as RESP-A is independent of the B-key and both the RESP-A and RESP-AB portions of RESP are identifiable or may be ascertained from the RESP. Preferably, however, the constituent bits of RESP-A are not mathematically combined, e.g., X-ORed, to the constituent bits of RESP-AB, but are simply appended or multiplexed together to form the RESP which may then be demultiplexed to recover RESP-A and RESP-AB. Moreover, the specific proportions of RESP-A and RESP-AB contained in the RESP may be varied to accommodate a particular message length and format. Thus, for example, the RESP may consist of any one of the following illustrative combinations:

1. All of RESP-A and all of RESP-AB.
2. One half of RESP-A and one half of RESP-AB.
3. X% of RESP-A and Y% of RESP-AB where X,Y is any number between 0 and 100.

It will be readily appreciated by those of ordinary skill in the art that the authentication system of FIG. 5, including the A-key dependent RESP-A output and the B-key (and, preferably also, A-key) dependent RESP-AB output, may be used for authentication on the analog control channel (ACC), the analog voice channel (AVC) and/or the digital traffic channel (DTC) at call set-up, mobile registration or during conversation and with or without encryption. It will be further appreciated that the A-key and B-key dependency of the other outputs of the authentication system, e.g., RESPBIS, S-key and B-key, may also be manipulated to effect the goals of the network operator. By way of illustration only, the RESPBIS may be made dependent on the A-key but not the B-key thereby allowing the successful authentication of a valid base station despite B-key asynchronization. The S-key, on the other hand, may be dependent on both the A-key and B-key while the new value of the B-key may be dependent on the current value of the B-key.

Exemplary AUTH

Described below is an exemplary authentication algorithm which may be used to implement the authentication system of FIG. 5 It should be emphasized that, as pointed out previously, a variety of authentication algorithms may be used for this purpose and the particular algorithm AUTH illustrated and discussed below is only one of a great many. In the description which follows, certain byte counts have been chosen for certain input and output variables of the exemplary AUTH. It should be clearly understood, however, that such byte counts are exemplary only and are not intended and should not be construed as a limitation on the general use or applicability of the exemplary AUTH. For example, the bit or byte lengths of RESP, RESPBIS and even RAND may change depending on which channel, e.g., analog control channel (ACC), analog voice channel (AVC), digital control channel (DCC) or digital traffic channel (DTC), is selected for the performance of unilateral or bilateral authentication. Such variations can be readily accommodated by the exemplary AUTH discussed hereinafter.

The exemplary AUTH uses a total of 32 bytes of input variables and generates 32 bytes of output variables. This is achieved by two applications of an algorithm which uses 16 bytes of input variables and generates 16 bytes of output variables. The input variables are:

RAND: Provision is made for up to 4 bytes] NON-SECRET
ESN: Provision is made for up to 4 bytes] VARIABLES
Ka: 12 bytes of the permanent key (A-key)] SECRET
Kb: 12 bytes of the rolling key (B-key)] VARIABLES The 32 output bytes are designated for use as follows:
0-3: Authentication response (RESP)
4-7: RESPBIS (needed for bilateral authentication)
8-12 : Information mask (if used)
13-23: Next Kb (if key update occurs)
24-31: Talk variable for enciphering call (S-key)

The 32 bytes of input to the algorithm are split into groups of 16 bytes which are then used in the first application of the algorithm to produce a first 16 bytes of output (bytes 0-15). The 32 bytes of input are then split in a different way and used in the second application of the algorithm to produce a second 16 bytes of output (bytes 16-31).

The algorithm is adapted for very efficient and fast execution on simple microprocessors of the type used in cellular radio telephones. Recursive use of a small inner code loop serves to confine the code within a 100-byte region. The outer loop consists of iteratively executing a mixing process six times. The mixing process is illustrated in FIG. 6.

Figure 6:
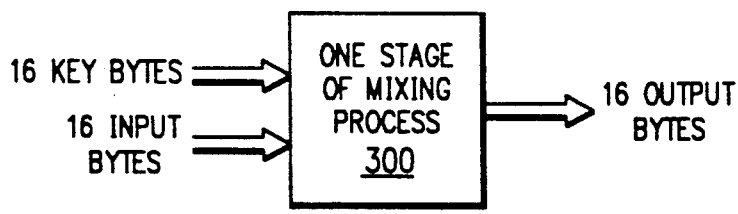
FIG. 6 is a schematic block diagram of the mixing process used in an exemplary authentication algorithm for the authentication system of FIG. 5.

Referring now to FIG. 6, there is shown therein a schematic block diagram of the mixing process used in the exemplary AUTH. The mixing process 300 is provided with a first input of 16 key bytes and a second input of 16 input bytes. The 16 input bytes to the first iteration consist of the 4 bytes of ESN, 4 bytes of RAND and the 8 rolling key bytes Kb(0-7), in the following order:
ESN: 4 bytes
RAND: 4 bytes
Kb(1)

Kb(2)
Kb(3)
Kb(4)
Kb(5)
Kb(6)
Kb(7)
Kb(0)

The 16 key bytes which are provided as input to each iteration of the mixing process are a cyclic selection from the 8 rolling key bytes Kb(0–7) and the 16 permanent key bytes Ka(0–15). In the first application of the algorithm, the order of use of the 16 key bytes may be as follows:

| Iteration number | Key bytes used |
|---|---|
| 1 | Ka(0) → Ka(15) |
| 2 | Kb(0) → Kb(7); Ka(0) → Ka(7) |
| 3 | Ka(8) → Ka(15); Kb(0) → Kb(7) |
| 4 | Kb(4) → Kb(7); Ka(0) → Ka(11) |
| 5 | Ka(4) → Ka(11); Kb(0) → Kb(3) |
| 6 | Ka(0) → Ka(12); Kb(0) → kb(2) |

The above key sequences may be obtained simply by copying the key variables to a temporary memory area in the order Kb, Ka, Kb again, and selecting them sequentially from this memory starting at the appropriate place for each iteration.

The mixing process 300 combines the 16 key bytes and the 16 input bytes in pairs using, for example, byte-wide add instructions The mixing process 300 also uses a random 1:1 substitution box or look-up table, referred to hereinafter as an S-Box, to convert a one byte value to another one byte value. An exemplary 1:1 S-Box which may be implemented by a 256-byte read-only memory (ROM) is set forth in the co-pending U.S. patent application Ser. No. 07/556,890, entitled "Authentication System For Digital cellular communications". A 1:1 S-box means that every 8-bit input value produces a unique 8-bit output value, or stated differently, every possible 8-bit value occurs only once in the look-up table.

Figure 7:
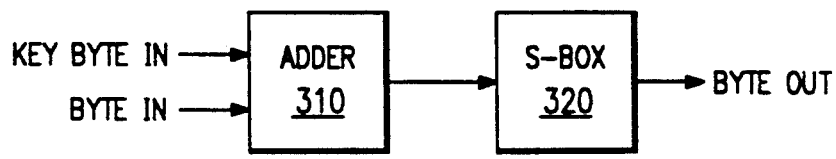
FIG. 7 is a schematic block diagram of a building block or mixing cell of the mixing process shown in FIG. 6.

Referring next to FIG. 7, a schematic block diagram of a building block or mixing cell of the mixing process 300 may now be seen. The mixing process 300 may be generally constructed from a plurality of mixing cells or inner loops of the type shown in FIG. 7 The particular mixing process 300 shown in FIG. 6 may be visualized as a vertical stack of 16 such mixing cells. Each of the cells is provided with one key byte and one input byte which are added together by an adder 310. The output of the adder 310 is used to address the contents of an S-box 320 which releases an output byte stored at the address defined by the output of the adder 310. A software implementation of a substantially similar mixing cell or inner loop is set forth in the abovereferenced co-pending U.S. patent application Ser. No. 07/556,890, entitled "Authentication System For Digital Cellular Communications".

The first application of the algorithm generates a first group of 16 output bytes, a part of which (bytes 0-7) may be used for the RESP and RESPBIS. The value of RESP (and RESPBIS) will depend on both the A-key and the B-key. In accordance with FIG. 5, however, the RESP should be partitioned into a first response portion RESP-A, which is dependent on the A-key but not the B-key, and a second response portion RESP-AB, which is dependent on both the A-key and the B-key To generate the RESP-A, the current value of the B-key is stored and the B-key is set to an arbitrary value known to both the mobile station and the network. The arbitrary value need not be a fixed number, but may be a dynamic number such as, for example, an indication of the particular frequency or time slot assigned by the network to the mobile station. With the B-key set to the arbitrary value, the first application of the algorithm is run a first time and a first RESP value is obtained and stored. This first RESP will depend on the fixed A-key and the known B-key and may be used as the source for RESP-A. The current value of the B-key is then retrieved and the first application of the algorithm is run a second time with the B-key set to the current value and a second RESP value is obtained and stored This second RESP value will depend on both the fixed A-key and the current B-key and may be used as the source for RESP-AB.

It will be recognized that if all the bytes of the first RESP are used to form RESP-A and all the bytes of the second RESP are used to from RESP-B, the byte-length of the RESP which is the combination of RESP-A and RESP-AB will double, in the present context, from four bytes to eight bytes. To preserve a certain maximum RESP length, only some of the bits of each of the first RESP (RESP-A) and the second RESP (RESP-AB) may be used to form the combined RESP. Generally speaking, there is no limitation on the number of bits or bytes which are selected from the first RESP and second RESP so long as at least one or more bits or bytes are selected from each Thus, for example, half of the first RESP and half of the second RESP or, alternatively, one fourth of the first RESP and three fourths of the second RESP, etc. are appended to each other or multiplexed together to form the total RESP.

The second application of the algorithm generates a second group of 16 output bytes which may be used for the conversation key (S-key), and, if performed, the updating of the rolling key (B-key) The second application of the algorithm is exactly the same as the first application except for the order in which the key bytes and input bytes are used In the second application of the algorithm, the order of use of the 16 key bytes may be as follows:

| Iteration number | Key bytes used |
|---|---|
| 1 | Kb(0) → Kb(7); Ka(0) → Ka(7) |
| 2 | Ka(8) → Ka(15); Kb(0) → Kb(7) |
| 3 | Kb(4) → Kb(7); Ka(0) → Ka(11) |
| 4 | Ka(4) → Ka(11); Kb(0) → Kb(3) |
| 5 | Ka(0) → Ka(15) |
| 6 | Ka(3) → Ka(15); Kb(0) → Kb(2) |

Additionally, the 16-byte input array may be initialized using Ka bytes instead of Kb bytes as follows:
ESN(0)
ESN(1)
ESN(2)
ESN(3)
RAND(0)
RAND(1)
RAND(0)
RAND(1)
Ka(0)
Ka(1)
Ka(2)
Ka(3)
Ka(4)

Ka(5)
Ka(6)
Ka(7)

After executing all six iterations of the second application of the algorithm, the second 8 bytes appearing in the 16-byte input array are used as the temporary enciphering variable (S-key) and the first 8 bytes become the next rolling key variable if an update of the rolling key is performed. In the event of a rolling key update, the first 8 output bytes overwrite the old rolling bytes in the order Kb(1), Kb(2), Kb(3), Kb(4), Kb(5), Kb(6), Kb(7), Kb(0).

Resynchronization of B-key

As discussed above, the current value of the rolling key (B-key), which is used, for example, in the second application of the exemplary algorithm to generate a new value for the B-key and S-key, may fall out of synchronization between the mobile station and the network. The B-key value used as an input to AUTH by the mobile station may be damaged or lost, and consequently fall out of synchronization with the B-key value used as an input to AUTH by the network, because of, for example, the presence of an electromagnetic pulse during any one of a number of read and write cycles in the mobile station memory. Furthermore, the useful life of the mobile station memory, i.e., the maximum number of read and write cycles, may be limited by, for example, a high ambient temperature. Asynchronization of the B-key may also result from the failure of the mobile station to update the B-key value at the time the network has ordered and performed an update. For example, the home network may have sent to the visited network where the mobile station is located a bilateral authentication order (message) containing RAND, RESP, RESPBIS and an activated B-key step flag. The visited network may regroup the RAND, RESPBIS and activated B-key step flag contents of the bilateral authentication message received from the home network into a new message to fit the air interface and then transmit the new message to the mobile station. At this point, the home network may step or roll the B-key value on the assumption that the mobile station will do the same upon receipt of the bilateral authentication message transmitted by the visited network. The mobile station, however, may have never received the message from the visited network and did not, therefore, roll the B-key value as required by the home network. The B-key values used by the mobile station and the network will no longer be synchronized.

Similarly, the B-key value used as an input to AUTH by the network may be lost or damaged because of, for example, a power outage, and the B-key values used by the mobile station and the network will no longer be synchronized. Asynchronization of the B-key, for whatever reason, may be indicated, for example, where the comparison between the responses generated in the network and the mobile station, respectively, yields a partial match, i.e., a match of the RESP-A portions but not the RESP-AB portions of the responses. Regardless of the reasons or the symptoms, however, asynchronization of the B-key inherently leads to the asynchronization of the S-key, which is dependent on the B-key, and, consequently, to a failure of encryption. Of course, privacy (encryption) may be an optional service for mobile subscribers in the network, e.g., the privacy service status may be defined in the subscriber service profile. Furthermore, the network may grant access to a mobile station on either the analog voice channel (AVC) or the digital traffic channel (DTC). If encryption is disabled for a particular mobile station or the network assigns the mobile station to the analog voice channel, asynchronization of the B-key and the S-key may be of little concern. In such instances, eventhough the B-key is unsynchronized, the network can nonetheless carry on partial or limited authentication of the mobile station as described heretofore. Similarly, eventhough the S-key is unsynchronized, the network and the mobile station can carry on unencrypted communications over the analog or digital voice channel.

On the other hand, if encryption is enabled and the network assigns the mobile station to the digital traffic channel, encrypted communications between the mobile station and the network will fail where the S-key is unsynchronized. In such other instances, eventhough privacy is enabled for the mobile subscriber in general, the network may simply disable encryption for the present call and any future calls until resynchronization of the S-key is somehow restored. For example, the network may inform the mobile station in the initial voice channel designation message or the handoff message to disable encryption for a particular call. This temporary or permanent loss of privacy, however, may be detrimental to the mobile subscriber and, ultimately, to the goodwill of the network operator. While partitioning of the RESP, as has been described herein, allows the partial or limited authentication of mobile stations and, hence, the detection of B-key asynchronization, a mechanism is needed to resynchronize the B-key and the S-key and to restore the network's ability to carry on full authentications and encrypted communications. Such a mechanism is described in detail below.

B-key Reset

According to the present invention, resynchronization of the B-key used by the network and the mobile station may be accomplished by resetting the B-key input to AUTH in each of the network and the mobile station to a selected value. The selected value may be a fixed value, such as zero, or a variable value, such as the channel, time slot or frequency assigned to the mobile station, or a combination of these values, or, more generally, any value which is known to both the mobile station and the network including a value which is generated in the network and sent to the mobile station. Resetting of the B-key in accordance with the present invention may be performed on the analog or digital voice or control channels, at any time, e.g., registration, call set-up, conversation, handoff, etc., by including in a message sent from the network to the mobile station an order or a signal (flag) to reset the B-key. For example, the B-key reset flag may be contained in the initial voice channel designation message, sent from the network to the mobile station on the control channel at call set-up, which instructs the mobile station to tune in to a particular voice channel frequency and an appropriate time slot.

The B-key reset flag may consist of any number of bits and, in the simplest case, may be no more than a single bit (1 or 0) assigned to a specific field in the message transmitted from the network to the mobile station. The network may reset the B-key value in the network to the selected value immediately before or at the time of activating the B-key step flag, i.e., setting the bit-value equal to 1 for example, in an order message sent to the mobile station or immediately after receiving from the mobile station an acknowledgement of the order message. Upon receiving the B-key reset order message, the mobile station resets the B-key value in the mobile station to the same selected value. The B-key values in the mobile station and the network are thereby initialized to the same selected value and B-key resynchronization is achieved once again.

As mentioned above, if the B-key is out of synchronization, so also is the S-key. Where encryption is desired, a new S-key must be calculated since the previous S-key was calculated using the previous B-key which was out of synchronization. Consequently, as an adjunct to the resetting of the B-key input to AUTH, the network and the mobile station may use the new B-key value, i e, the selected value (zero, for example), in AUTH to calculate a new S-key which can be used immediately to encipher communications between the mobile station and the network if encryption is enabled In addition, if unilateral authentication, or, alternatively, bilateral authentication with the B-key step flag inactive, is requested, the response output of AUTH, e.g., RESP and/or RESPBIS, as applicable, calculated with the B-key input set to the selected value, may be used to authenticate the mobile station and/or the network, as applicable.

It may be appreciated that resetting of the B-key to a known value, while reestablishing B-key synchronization, may reduce the number of secret key variables from two, e.g., both the A-key and the B-key, to one, e.g., the A-key only. After resetting the B-key to the selected value (zero, for example), the B-key input to AUTH will remain equal to the selected value until a bilateral authentication order, with the B-key step flag active, is issued by the network and received by the mobile station The mobile station will then use AUTH to calculate a new RESP and RESPBIS and a new B-key value which replaces the selected value as the B-key input to AUTH After performing a number of successive bilateral authentications, with the B-key step flag active, B-key secrecy may be restored and the number of secret key variables raised from one, e.g., the A-key only, to two, e.g., both the A-key and the B-key, once again.

As mentioned above, the timing of B-key reset in the network vis-a-vis the mobile station is generally not critical and the network may reset the B-key value in the network before or after activating the B-key reset flag in a message sent to the mobile station. In some instances, however, the network may be required to reset the B-key value in the network prior to the occurrence of certain events other than the activation of the B-key reset flag. In the case of unilateral authentication, for example, the network may reset the B-key input to AUTH in the network at or immediately before the time of sending the authentication order to the mobile station, or more generally, at any time prior to validating the RESP returned by the mobile station. By contrast, in the case of bilateral authentication, the network must reset the B-key to the selected value and calculate a new RESPBIS before sending the authentication order containing the new RESPBIS to the mobile station which validates the RESPBIS using the selected value as the B-key input to AUTH.

Linking B-key Reset to Bilateral Authentication

As described above, the B-key reset flag may be included in any desired message (order) sent from the network to the mobile station on any desired channel. Consequently, a false base station may be able to reset the rolling keys used by valid mobile stations within its coverage area. To guard against this risk, the performance of a B-key reset may be linked to the performance of bilateral authentication, i.e., to the validation of the network. In accordance with the present invention, bilateral authentication may be used to control B-key resetting and to combat the threat of sabotage by false base stations masquerading in the network. Broadly speaking, in the present invention, B-key resetting may be short-lived, i.e., the B-key input to AUTH is only temporarily replaced by the selected value if the network signals B-key reset, unless followed by a successful bilateral authentication which confirms the identity of the network and restores the secrecy of the B-key A specific example of the linkage between B-key reset and bilateral authentication follows.

Exemplary Call

Assume that a roaming mobile station has successfully registered with a visited network and a call has originated with the roaming subscriber. The mobile station sends a message to the visited network on the control channel requesting a voice or traffic channel assignment. The network responds by sending an initial voice or traffic channel designation message. Assume further that the voice or traffic channel designation message includes a B-key reset flag which has been activated by the visited network, i.e., set equal to 1, for example. Upon receiving the voice or traffic channel designation message, the mobile station tunes its transmitter and receiver to the assigned voice or traffic channel. Furthermore, upon detecting that the visited network has signalled a B-key reset, the mobile station saves the current values of the B-key and S-key in memory and sets the value of the B-key input to AUTH equal to the selected value, e g , a known fixed value, as described heretofore. The mobile station may then execute AUTH using the selected value as the B-key input to AUTH. Once AUTH has been executed, the mobile station may use the B-key output generated by AUTH to replace the selected value as the B-key input to AUTH. The S-key output of AUTH may be used to encipher the present outstanding call if encryption is desired. In other words, the new S-key is not simply saved for the next call but may also be used as an encryption key during this call where the B-key and, hence, the B-key dependent S-key, have fallen out of synchronization and the old S-key can, therefore, no longer be used to encrypt this call.

Assume now that the call has been terminated or completed. Call termination may occur because of a loss of radio link continuity between the mobile station and the serving network, e g, signal fade or failure. For example, while tuned to an assigned voice or traffic channel, the mobile station may have entered an underground garage which is impervious to radio signals transmitted to and from the mobile station leading to an abrupt disconnection of the call. Call completion, on the other hand, occurs where one of the parties to the call hangs up the telephone and is the more common way in which a call is disconnected. The network detects the on-hook condition and sends a release message to the mobile station. Whether the call is terminated or completed, the mobile station, at the end of the call, determines whether there was a B-key update after the B-key reset. As further explained below, such an update requires both a successful bilateral authentication and an activated B-key step flag. If no B-key update is indicated, the mobile station retrieves from memory the old value of the B-key, i.e., the then current value of the B-key prior to the B-key reset, and sets the B-key input to AUTH equal to the old value of the B-key The old value of the S-key, i.e., the then current value of the S-key prior to the B-key reset, may be used to encipher the next call.

Assume now that the visited network had issued a bilateral authentication order to the mobile station on the voice or traffic channel during the call. Assume further that the bilateral authentication order included an active B-key step flag. Upon receiving the bilateral authentication order, the mobile station executes AUTH using as AUTH inputs the RAND value received in the authentication order and the B-key value generated from the execution of AUTH following B-key reset, and calculates a RESPBIS in accordance with AUTH. The mobile station then compares the internally generated RESPBIS with the RESPBIS received in the authentication order. If the bilateral authentication is successful, i.e., if the internally generated RESPBIS matches the RESPBIS received from the network, and assuming that the B-key step flag is active, the mobile station sets the B-key input to AUTH equal to the newly calculated B-key value. The newly calculated S-key value may be saved and used for enciphering the next call (unless replaced by another bilateral authentication, with B-key step flag active, during this call). If the bilateral authentication is successful, but the B-key step flag is inactive, the current B-key is saved and used for the next authentication and the current S-key is saved and used to encipher the next call (unless replaced by another bilateral authentication, with B-key step flag active, during this call).

Whether or not the B-key step flag has been activated, if the bilateral authentication is successful the mobile station sends to the network a bilateral authentication response message containing the internally generated RESP. Otherwise, i.e., if the bilateral authentication is not successful, the mobile station sends an acknowledgement (ACK) message confirming receipt of the authentication order from the network. Assuming that bilateral authentication was successful during the call and a B-key update was triggered, at the end of the call, the mobile station concludes, this time, that there was a B-key update after the B-key reset and, therefore, does not reinstate the old values of the B-key and S-key as in the case described above where no B-key update was indicated. In other words, the updated values of the B-key and S-key are preserved for the next authentication and next call, respectively.

It will be appreciated from the foregoing discussion that only a subsequent, successful bilateral authentication with B-key step flag activated can initiate a new history for the B-key following a B-key reset. A false (fraudulent) base station which signals a B-key reset to the mobile station is able to reset the value of the B-key only for the duration of a particular call since, at the end of the call and unless a successful bilateral authentication has updated the B-key, the mobile station will replace the values of the falsely reset B-key and S-key with the original values of the B-key and S-key, respectively, prior to the false B-key reset, e.g., at the beginning of the call. The fraudulent base station cannot update the B-key because an attempted bilateral authentication of the false base station will fail and the mobile station will not update the B-key even if the B-key step flag was activated by the false base station. Specifically, only the home network, which has access to the A-key and the B-key, can produce a valid RESPBIS, and only the visited network, which is in genuine contact with the home network, can obtain and transmit a valid RESPBIS to the mobile station.

Figure 8:
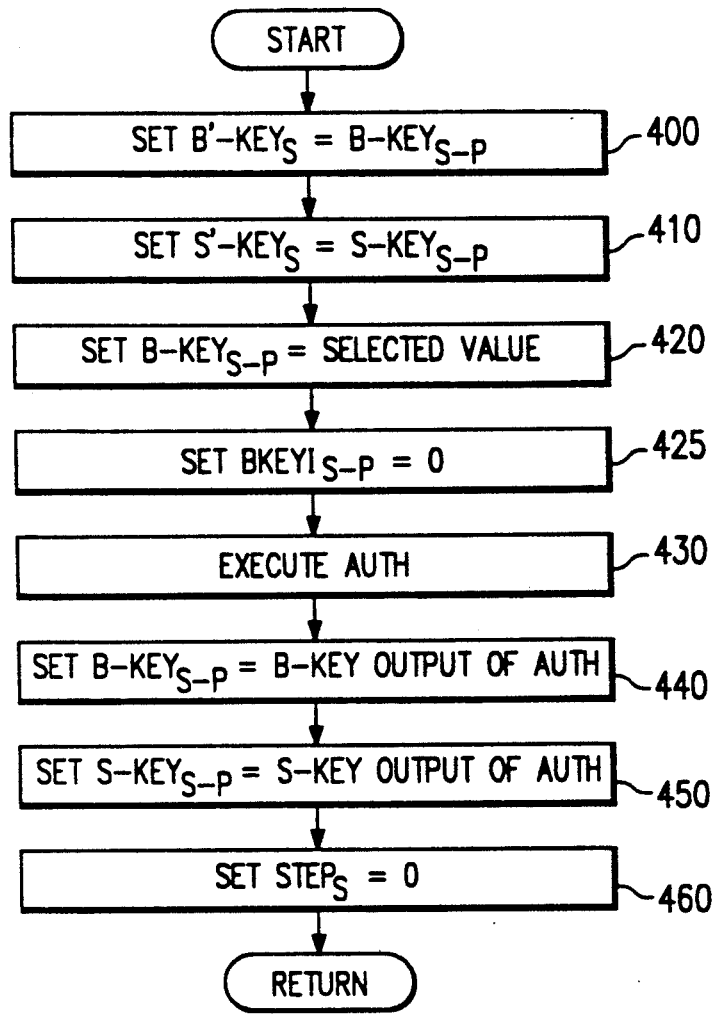
FIGS. 8-10 are flow chart diagrams which illustrate bilateral authentication control of B-key reset in accordance with the present invention.
Figure 10:
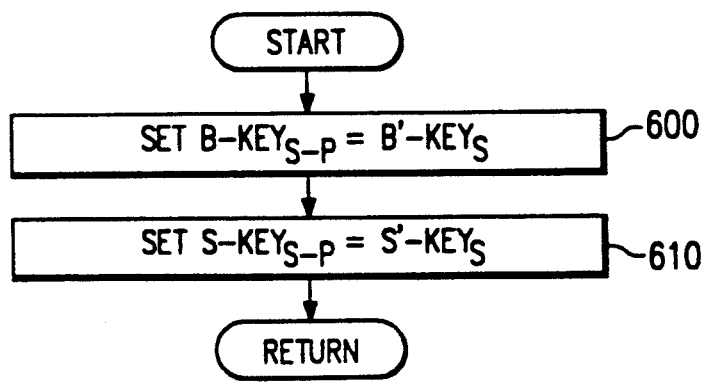
Figure 9:
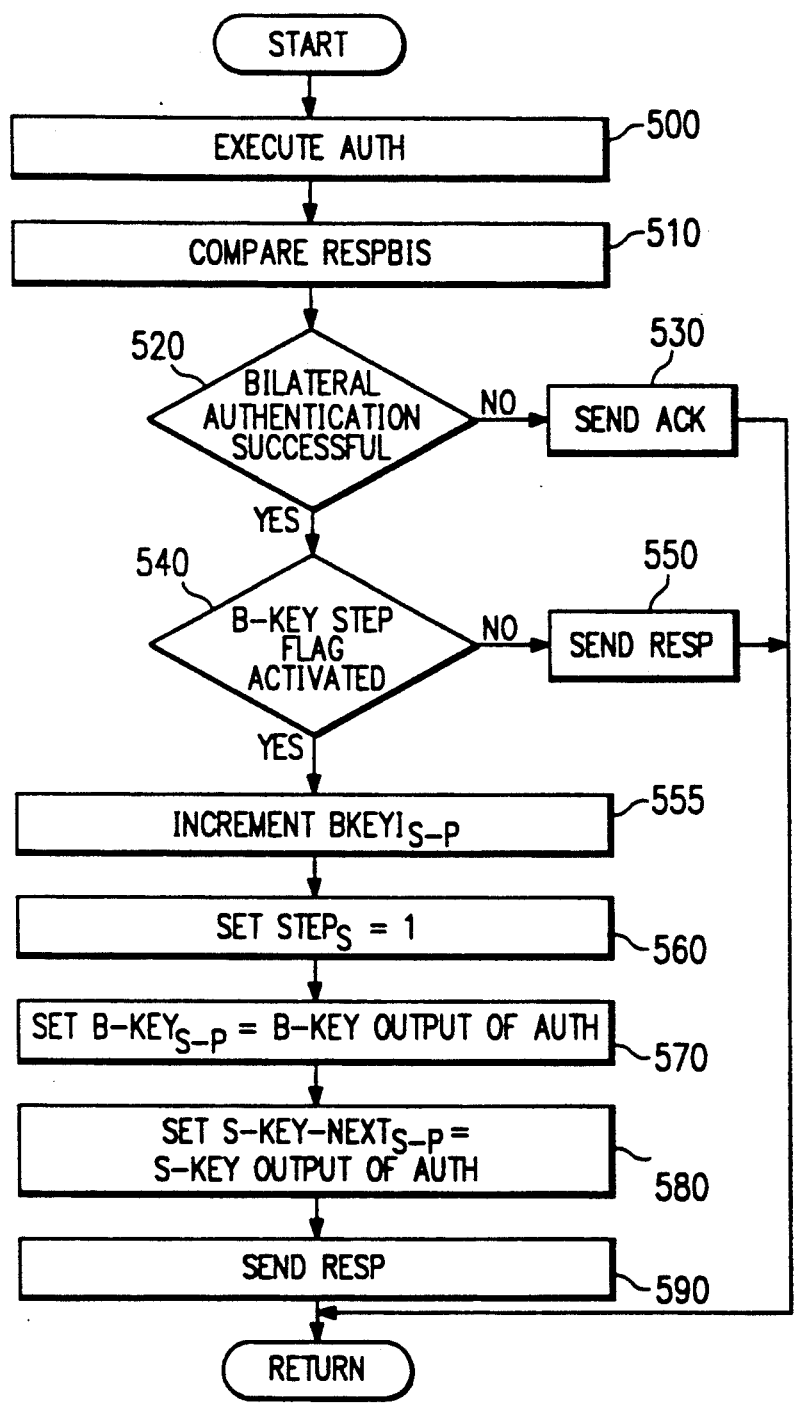

The linkage between bilateral authentication and B-key reset may be further understood by reference to FIGS. 8–10 which illustrate the exemplary call described above in flow chart form. Certain terms which appear in these figures and/or the associated discussion, but which have not heretofore been specifically referred to, are defined immediately below:

(1) "BKR" is the B-key reset flag (field) which signals a B-key reset to the mobile station, i.e., indicates whether the mobile station is to reset the B-key$_{s-p}$.

(2) "BKR$_s$" is the stored value of BKR in the mobile station's temporary memory. BKR$_s$ is used to indicate whether or not the mobile station has reset the B-key$_{s-p}$ during a call.

(3) "B-key$_{s'p}$" is the stored value of the B-key in the mobile station's semi-permanent security and identification memory. B-key$_{s-p}$ is used as the B-key input to AUTH and is temporarily replaced by the selected value, for example, a fixed value, when the network signals a B-key reset.

(4) "B'-key$_s$" is the stored value of the previously used B-key$_{s-p}$ in the mobile station's temporary memory.

(5) "BKEYI$_{s-p}$" is the stored value of the B-key index in the mobile station's semi-permanent security and identification memory. BKEYI$_{s-p}$ is incremented whenever the mobile station steps (updates) the B-key$_{s-p}$.

(6) "S-key$_{s-p}$" is the stored value of the S-key in the mobile station's semi-permanent security and identification memory. S-key$_{s-p}$ is used to encipher a call.

(7) "S'-key$_s$" is the stored value of the previously used S-key$_{s-p}$ in the mobile station's temporary memory.

(8) "S-key-next$_{s-p}$" is the stored value of the next S-key in the mobile station's semi-permanent security and identification memory. S-key-next$_{s-p}$ is used to encipher the next call. At the beginning of each call, the mobile station replaces the value of the S-key$_{s-p}$ with the value of the S-key-next$_{s-p}$.

(9) "Step$_s$" is a value stored in the mobile station's temporary memory which identifies whether the mobile station has stepped (updated) the B-key$_{s-p}$ during a call.

Referring now to FIGS. 8–10, there is shown therein a series of flow chart diagrams which, taken together along with the accompanying discussion, illustrate bilateral authentication control of B-key reset in the mobile station. As discussed above, the network may include the B-key reset flag (BKR) in any message sent to the mobile station on any channel. For example, the network may activate the BKR, e.g., set BKR equal to 1, in the initial voice or traffic channel designation message. The mobile station sets the value of S-key$_{s-p}$ equal to the value of S-key-next$_{s-p}$ and sets the value of BKR$_s$ equal to the value of BKR received in the message. If BKR is activated, e.g., BKR=1, the mobile station performs the tasks shown in FIG. 8. At blocks 400, 410, the mobile station sets the values of B'-key$_s$ and S'-key$_s$ equal to the values of B-key$_{s-p}$ and S-key$_{s-p}$, respectively. The foregoing steps save the current values of the B-key and the S-key in memory prior to resetting of the B-key. At block 420, the mobile station sets the value of B-key$_{s-p}$ equal to the selected value, i.e., a value known to both the mobile station and the network, and, at block 425, the mobile station sets the value of BKEYI$_{s-p}$ equal to zero. With the B-key input to AUTH set to the selected value, the mobile station, at block 430, executes AUTH and generates new values for the B-key and the S-key. Subsequently, at blocks 440, 450, the mobile station sets the values of B-key$_{s-p}$ and S-key$_{s-p}$ equal to the values of the B-key and S-key outputs of AUTH, respectively. At this point, the network and the mobile station will have the same B-key and S-key With the B-key resynchronized, full authentication becomes possible. With the S-key resynchronized, encryption of the present call becomes possible. Finally, at block 460, the mobile station sets the value of Step$_s$ equal to 0 and, thereafter, returns to processing other tasks.

If, before the end of the present call, the B-key reset is followed by a bilateral authentication order, the mobile station will perform the tasks shown in FIG. 9. At block 500, the mobile station executes AUTH and, at block 510, compares the RESPBIS generated by AUTH with the RESPBIS received from the network. At decision block 520, the mobile station determines whether the bilateral authentication is successful, e.g., whether the RESPBIS match. If the bilateral authentication is not successful, the mobile station, at block 530, sends an acknowledgement (ACK) message to the network. However, if the bilateral authentication is successful, the mobile station, at decision block 540, determines whether the B-key step flag has been activated, e.g., whether the flag value equals 1. If the bilateral authentication is successful but the B-key step flag is inactive, the mobile station, at block 550, sends the RESP output of AUTH in a bilateral authentication message to the network On the other hand, if the bilateral authentication is successful and the B-key step flag is active, the mobile station proceeds to block 555 and increments BKEYI$_{s-p}$ to indicate a B-key update. At block 560, the mobile station sets Step$_s$ equal to 1 to indicate a B-key update during this call. At block 570, the mobile station sets the value of the B-key$_{s-p}$ equal to the value of the B-key output of AUTH. At block 580, the mobile station sets the value of the S-key-next$_{s-p}$ equal to the value of the S-key output of AUTH. The foregoing step saves the value of the S-key generated in this call for use in the next call. At block 590, the mobile station sends the RESP output of AUTH in a bilateral authentication message to the network and returns to processing other tasks.

If the B-key reset is not followed by a B-key step before the end of the call, i.e., if Step$_s$=0 and BKR$_s$=1, the mobile station will perform the tasks shown in FIG. 10 upon call termination or completion. At block 600, the mobile station sets the value of B-key$_{s-p}$ equal to the value of B'-key$_s$. At block 610, the mobile station sets the value of S-key$_{s-p}$ equal to the value of S'-key$_s$. The foregoing steps recover or recapture the then current values of the B-key and S-key prior to execution of B-key reset. Next, the mobile station returns to processing other tasks.

As may be seen from FIGS. 8-10, a B-key reset becomes a permanent chapter in the history of the B-key only if the B-key reset is followed by a B-key update instigated by a valid network. If no such subsequent B-key update is forthcoming, the B-key value is set back to the original value at the time prior to execution of the B-key reset. While in the illustrated example above, the original B-key is recovered at the end of the call, the time for such recovery is by no means limited to the instance of call termination or completion. For example, the mobile station may, after resetting the B-key, start a timer which may be reset every time a B-key update is performed. If, at the expiration of the period defined by the timer and, possibly, before the end of the call, Step$_s$=0 and BKR$_s$=1, the mobile station will perform the tasks shown in FIG. 10 in the same manner as heretofore described in the event of call termination or completion.

Returning briefly to FIGS. 8-10 and the accompanying discussion, the execution cf AUTH at block 430 of FIG. 8, after the resetting of the B-key input to AUTH at block 420, may be an optional step where, for example, encryption is either not enabled or not desired for the present call and, therefore, calculation of a new S-key is either not necessary or may be delayed until the next successful bilateral authentication with B-key step flag activated. Similarly, even where AUTH is routinely executed following B-key reset, the step of replacing the selected value with the B-key value generated from the execution of AUTH as shown at block 440 of FIG. 8 may also be optional. If this replacement step is not performed, the value of the B-key input to AUTH will remain equal to the selected value, set by the initial or any subsequent B-key reset, until and unless a successful bilateral authentication with B-key step flag activated confers a new B-key value on the B-key$_{s-p}$ as illustrated in FIG. 9. If no B-key update occurs within the prescribed time period, the old value of the B-key prior to B-key reset will replace the selected value as illustrated in FIG. 10.

B-key Reset in a Location Register Environment

It will be appreciated that the teachings of the present invention on B-key reset, as set forth above, have general applicability and are pertinent to cellular operation in both exchange and location register environments. The need for a B-key reset in a location register environment may arise, for example, when a home location register (HLR) failure leads to a loss of roaming subscriber information. The roaming subscribers may be presently located at a variety of visitor location registers (VLRs) including the VLR of their home location. Each of the VLRs may store a number of, as-yet, unused sets of security variables, e.g., RAND, RESP, RESPBIS, S-key and/or B-key step flag values, which may have been obtained from the HLR on the last occasion an authentication was successfully performed. The VLR may continue to use these variables in authentication and/or encryption until the stored values are exhausted, at which point, the VLR may request additional values from the HLR.

If, for example, the HLR has suffered a power failure and been subject to a "reboot", the HLR may reset the internally stored B-keys of the associated mobile subscribers equal to their respective MINs and compute authentication responses using the MIN values as the B-key inputs to AUTH. The HLR may request or instruct the VLR to grant access, e g., assign a voice or traffic channel, to the mobile station even though the response sent by the mobile station does not tally, and to order the mobile station to reset the B-key equal to MIN, and to perform bilateral authentication on the voice or traffic channel. This instruction may consist of a flag contained in the reply sent from the HLR to the VLR which has requested additional security variables.

The reply message may also include the parameters for bilateral authentication, e.g., RAND, RESP, RESPBIS, S-key and/or B-key step flag values.

The B-key reset to MIN order may consist of a flag bit in the voice or traffic assignment message field which is activated, e g., set to 1, by the VLR and sent to the mobile station in the initial voice or traffic channel designation message. Upon detecting this order, the mobile station computes a new conversation key (S-key) by temporary use of the MIN in place of the B-key in AUTH but without, as-yet, destroying the current value of the B-key. In other words, the mobile station performs the tasks shown in FIG. 8 with the selected value set equal to MIN. The mobile station may then use the newly computed S-key to encrypt communications on the voice or traffic channel.

When the VLR requests bilateral authentication along with rolling key update on the voice or traffic channel, the mobile station verifies that the request has originated from its HLR and updates the B-key value to the new value just computed by using, as inputs to AUTH, the MIN in place of the B-key and the RAND relayed from the HLR. In other words, the mobile station performs the tasks shown in FIG. 9. Thereafter, the mobile station and the HLR attain a new pseudo-random starting point for the rolling key.

The rolling key recovery procedure described above for the case of an HLR failure may also be used in the event of mobile station failure, i.e., where the mobile station rolling key falls out of step with the HLR rolling key because of, for example, the failure of either to complete a B-key update. Where the rolling key in the mobile station is damaged or lost without a loss of other essential variables, authentication will fail and the VLR may then request the HLR to implement B-key recovery in the manner described above. Preferably, a bilateral authentication is performed wherein the HLR first releases RAND, RESP and RESPBIS to the VLR and awaits return by the VLR, and validation by the HLR, of the mobile station's RESP before resetting the HLR rolling key.

It will be appreciated from the foregoing discussion that, in addition to MIN, other values, such as the system identification (SID) of the home system, may be used in the B-key recovery procedure described above. It will also be appreciated from the succeeding discussion that if, as discussed elsewhere herein, the B-key update is linked to a B-key index counter update, and the B-key is no longer synchronized, the HLR may, prior to initiating B-key recovery, use the B-key index counter to indicate whether a "backtrack" procedure will restore B-key synchronization.

Alternative B-key Resynchronization Mechanisms

The B-key reset procedures described heretofore may be only one of a number of B-key resynchronization means which are available to the network operator in accordance with the present invention. Assume, for example, that a mobile subscriber has roamed from his or her home network to a first visited network which orders an authentication of the mobile station and receives in the process several successive sets of security variables, e.g., RAND, RESP, RESPBIS, S-key and B-key step flag values, from the home network. The home network may have activated the B-key step flag in one or more of these sets. As discussed previously, the home network maintains a B-key index counter which stores an indication of the number of times the home network has updated the B-key. In the process of successively calculating these sets of security variables, and to avoid computational complexity, the home network may store the value of the B-key in each iteration of the execution of AUTH along with the value of the B-key index for the first iteration, all iterations, or for at least one of the iterations as a reference pointer. Alternatively, and to save memory space, the home network may store only the value of the B-key and the B-key index for the first iteration along with the RAND value for each iteration which was followed by a B-key update.

Assume now that the mobile station has traveled from the first visited network to a second visited network (or has been deactivated and reactivated in the first visited network, i e., the second visited network and the first visited network are the same). At the time of soliciting access to the second visited network over the control channel or at any time during a call over the voice channel, the second visited network may request from the mobile station, or the mobile station may automatically send to the second visited network, the current value of the B-key index. For example, the second visited network may order an authentication of the mobile station over the control channel using a global RAND. Upon receiving RAND, and in addition to sending a response (RESP), the mobile station may automatically send the current value of the B-key index to the second visited network. The second visited network may, in turn, send the current value of the mobile station B-key index counter to the home network. By comparing the current value of the mobile station B-key index to the current value of the home network B-key index, the home network may conclude that the mobile station has not updated the B-key and incremented the B-key index counter as often as the home network updated the B-key and incremented the B-key index counter during the calculation of the sets of security variables sent to the first visited network. Specifically, for example, the first visited network may have used only a portion of the sets of security variables received from the home network, including only a portion of any activated B-key step flag values.

Nevertheless, by comparing the current value of the mobile station B-key index to the stored value of the home network B-key index at the beginning of the calculation of the sets of security variables sent to the first visited network, the actual number of times "n" that the mobile station updated the B-key while roaming in the first visited network may be determined. If the home network has stored the B-keys for all iterations of AUTH executed in the calculation of the sets of security variables, the value of the B-key in the iteration(s) of AUTH following n increments of the B-key index counter may be retrieved from memory and used to resynchronize the B-key in the home network and the mobile station. If, on the other hand, the home network has stored only the B-key value for the first iteration executed in the calculation of the sets of security variables and the RAND value for each of these iterations which was followed by a B-key update, the home network may use the stored value of the B-key as the starting B-key value for AUTH and successively use the stored RAND values to execute n iterations of AUTH updating the B-key value after each iteration to arrive at the value of the B-key in the mobile station and restore synchronization. In any event, the home network may set the current value of the B-key index counter in the home network equal to the current value of the B-key index counter in the mobile station and may send new sets of security variables to the second visited network.

In the example described immediately above, and as a substitute for the use of the B-key index, the home network may request the first visited network to identify the number or particular sets of security variables actually used by the first visited network while serving the mobile station. Specifically, the home network may request the first visited network to identify the number of times that the first visited network has ordered the mobile station to perform a B-key update, e.g., the number of bilateral authentication messages containing an activated B-key step flag, and has received from the mobile station an acknowledgement confirming that the mobile station has updated the B-key in response to the order. Armed with this information, the home network may "backtrack" and determine the current value of the mobile station B-key in the manner just described. In the alternative, of course, the home network may request the second visited network to order the mobile station to reset the B-key to a selected value in the manner illustrated and described heretofore.

Modifications and Variations

The foregoing detailed description shows only certain particular embodiments of the present invention. However, those skilled in the art will recognize that many modifications and variations may be made without departing substantially from the spirit and scope of the present invention. Accordingly, it should be clearly understood that the form of the invention described herein is exemplary only and is not intended as a limitation on the scope of the invention as defined in the following claims.

What is claimed is:

1. In a radio network providing service to a mobile station, a method for the resynchronization of a rolling key used as an input value among a plurality of input values to an authentication processor in each of said network and said mobile station, said method comprising the steps of:
   setting said network rolling key input value to a selected value;
   commanding said mobile station to set said mobile station rolling key input value to said selected value; and
   setting said mobile station rolling key input value to said selected value in response to said command.

2. A method according to claim wherein said selected value is a value known to said network and said mobile station and selected from the group consisting of a fixed value, a variable value or a combination of a fixed value and a variable value.

3. A method according to claim 1 wherein said commanding step includes the steps of:
   activating a rolling key reset flag contained in an order message; and
   transmitting said order message from said network to said mobile station.

4. A method according to claim 3 wherein said rolling key reset flag comprises a single bit and said activating step comprises the step of setting the value of said rolling key reset flag equal to 1.

5. A method according to claim wherein said authentication algorithm generates a set of outputs, including a conversation key for enciphering communications between said network and said mobile station, and said method further comprises the steps of:
   executing said authentication algorithm in each of said network and said mobile station with said rolling key input set to said selected value; and
   using said conversation key output, generated by said authentication algorithm with said rolling key input set to said selected value, to encipher said communications.

6. A method according to claim wherein said authentication algorithm generates a set of outputs, including a replacement rolling key for replacing the value of said rolling key input, and said method further comprises the steps of:
   executing said authentication algorithm in each of said network and said mobile station with said rolling key input set to said selected value; and
   using said replacement rolling key output, generated by said authentication algorithm with said rolling key input set to said selected value, to replace said selected value as said rolling key input.

7. A method according to claim 1 wherein said authentication algorithm generates a set of outputs, including a unilateral authentication response for validating said mobile station, and said method further comprises the steps of:
   executing said authentication algorithm in each of said network and said mobile station with said rolling key input set to said selected value; and
   using said unilateral authentication response output, generated by said authentication algorithm with said rolling key input set to said selected value, to validate said mobile station.

8. A method according to claim 7 wherein said set of outputs further includes a bilateral authentication response for validating said network and said method further comprises the step of:
   using said bilateral authentication response output, generated by said authentication algorithm with said rolling key input set to said selected value, to validate said network.

9. A method according to claim 7 wherein said set of inputs further includes a permanent key and said unilateral authentication response comprises:
   a first response which is dependent on said permanent key input and independent of said rolling key input; and
   a second response which is dependent on said rolling key input.

10. In a radio network providing service to a mobile station, a system for the resynchronization of a rolling key used as an input value among a plurality of input values to an authentication processor in each of said network and said mobile station, said system comprising:
    means for setting said network rolling key input value to a selected value;
    means for commanding said mobile station to set said mobile station rolling key input value to said selected value; and
    means for setting said mobile station rolling key input value to said selected value in response to said command.

11. A system according to claim 10 wherein said selected value is a value known to said network and said mobile station and selected from the group consisting of a fixed value, a variable value or a combination of a fixed value and a variable value.

12. A system according to claim 10 wherein said commanding means includes:
  means for activating a rolling key reset flag contained in an order message; and
  means for transmitting said order message from said network to said mobile station.

13. A system according to claim 12 wherein said rolling key reset flag comprises a single bit and said activating means comprises means for setting the value of said rolling key reset flag equal to 1.

14. A system according to claim 10 wherein said authentication algorithm generates a set of outputs, including a conversation key for enciphering communications between said network and said mobile station, and said system further comprises:
  means for executing said authentication algorithm in each of said network and said mobile station with said rolling key input set to said selected value; and
  means for using said conversation key output, generated by said authentication algorithm with said rolling key input set to said selected value, to encipher said communications.

15. A system according to claim 10 wherein said authentication algorithm generates a set of outputs, including a replacement rolling key for replacing the value of said rolling key input, and said system further comprises:
  means for executing said authentication algorithm in each of said network and said mobile station with said rolling key input set to said selected value; and
  means for using said replacement rolling key output, generated by said authentication algorithm with said rolling key input set to said selected value, to replace said selected value as said rolling key input.

16. A system according to claim 10 wherein said authentication algorithm generates a set of outputs, including a unilateral authentication response for validating said mobile station, and said system further comprises:
  means for executing said authentication algorithm in each of said network and said mobile station with said rolling key input set to said selected value; and
  means for using said unilateral authentication response output, generated by said authentication algorithm with said rolling key input set to said selected value, to validate said mobile station.

17. A system according to claim 16 wherein said set of outputs further includes a bilateral authentication response for validating said network and said system further comprises:
  means for using said bilateral authentication response output, generated by said authentication algorithm with said rolling key input set to said selected value, to validate said network.

18. A system according to claim 16 wherein said set of inputs further includes a permanent key and said unilateral authentication response comprises:
  a first response which is dependent on said permanent key input and independent of said rolling key input; and
  a second response which is dependent on said rolling key input.

19. A method for controlling the resetting of a rolling key used in the validation of a mobile station and a serving radio network, said method comprising the steps of:
  storing in memory the current value of said rolling key;
  setting the current value of said rolling key to a selected value; and
  resetting the current value of said rolling key to said stored rolling key value in response to an indication of a failure of said rolling key to be updated during a predetermined period of time.

20. A method according to claim 19 wherein said rolling key is updated in said mobile station only in response to an indication of a validation of said network 21. A method according to claim 19 wherein said rolling key is also used to generate an encryption key and said method further comprises the steps of:
  storing in memory the current value of said encryption key at said first moment of time; and
  resetting the current value of said encryption key at said second moment of time to said stored encryption key value in response to said indication of a failure of said rolling key to be updated between said first and second moments of time.

22. A method according to claim 21 wherein the current values of said rolling key and said encryption key at the beginning of a call are stored in memory, and the current values of said rolling key and said encryption key at the end of said call are reset to their respective stored values in response to an indication of a failure of said rolling key to be updated during said call.

23. A system for controlling the resetting of a rolling key used in the validation of a mobile station and a serving radio network comprising:
  means for storing in memory the current value of said rolling key;
  means for setting the current value of said rolling key to a selected value; and
  means for resetting the current value of said rolling key to said stored rolling key value in response to an indication of a failure of said rolling key to be updated during a predetermined period of time.

24. A system according to claim 23 wherein said rolling key is updated in said mobile station only in response to an indication of a validation of said network.

25. A system according to claim 23 wherein said rolling key is also used to generate an encryption key and said system further comprises:
  means for storing in memory the current value of said encryption key at said first moment of time; and
  means for resetting the current value of said encryption key at said second moment of time to said stored encryption key value in response to said indication of a failure of said rolling key to be updated between said first and second moments of time.

26. A system according to claim 25 wherein the current values of said rolling key and said encryption key at the beginning of a call are stored in memory, and the current values of said rolling key and said encryption key at the end of said call are reset to their respective stored values in response to an indication of a failure of said rolling key to be updated during said call.

27. In a system for the verification and validation of a mobile station and a radio network in accordance with an authentication algorithm executed on an authentication processor in each of said mobile station and said network, said mobile station authentication processor receiving a plurality of input values including a changeable key input value stored in a first location in memory and a fixed key input value, said mobile station authentication processor generating a plurality of output values including a ciphering key output value stored in a second location in memory and used to encipher a call, a changeable key output value and a network response output value, a method for linking the resetting of said changeable key input value in said mobile station to the validation of said network, said method comprising the steps of:

transmitting from said network to said mobile station a signal indicative of a changeable key reset;

saving the changeable key input value stored in said first location to a third location in memory in response to the receipt of said changeable key reset signal;

saving the ciphering key output value stored in said second location to a fourth location in memory in response to the receipt of said changeable key reset signal;

setting the changeable key input value stored in said first location to a selected value;

executing said authentication algorithm on said mobile station authentication processor a first time;

setting the changeable key input value stored in said first location to the changeable key output value generated by said first execution of said authentication algorithm on said mobile station authentication processor;

setting the ciphering key output value stored in said second location to the ciphering key output value generated by said first execution of said authentication algorithm on said mobile station authentication processor;

transmitting from said network to said mobile station the network response output value generated in said network;

executing said authentication algorithm on said mobile station authentication processor a second time in response to the receipt of the network response output value generated in said network;

comparing the network response output value generated by said second execution of said authentication algorithm on said mobile station authentication processor with the network response output value generated in said network;

determining whether said network has transmitted to said mobile station a signal indicative of a changeable key update;

setting the changeable key input value stored in said first location to the changeable key output value generated by said second execution of said authentication algorithm on said mobile station authentication processor in response to an indication that the network response output value generated by said second execution of said authentication algorithm on said mobile station authentication processor matches the network response output value generated in said network and an indication that said mobile station has received said changeable key update signal from said network;

setting the changeable key input value stored in said first location to the changeable key input value stored in said third location in response to an indication that the network response output value generated by said second execution of said authentication algorithm on said mobile station authentication processor does not match the network response output value generated in said network or an indication that said mobile station has not received said changeable key update signal from said network; and setting the ciphering key output value stored in said second location to the ciphering key output value stored in said fourth location in response to said indication that the network response output value generated by said second execution of said authentication algorithm on said mobile station authentication processor does not match the network response output value generated in said network or said indication that said mobile station has not received said changeable key update signal from said network.

28. A method according to claim 27 further comprising the steps of:

saving the ciphering key output value generated by said second execution of said mobile station authentication algorithm to a fifth location in memory; and setting the ciphering key output value stored in said second location to the ciphering key output value stored in said firth location to encipher a subsequent call.

29. A method according to claim 27 wherein said plurality of outputs of said mobile station authentication algorithm further include a first mobile station response signal output which is dependent on said fixed key input and independent of said changeable key input and a second mobile station response signal output which is dependent on said changeable key input, and said method further comprises the step of sending the first and second mobile station response signals to said network in response to said indication that the network response signal generated by said second execution of said mobile station authentication algorithm matches the network response signal generated in said network.

30. In a system for the verification and validation of a mobile station and a radio network in accordance with an authentication algorithm executed on an authentication processor in each of said mobile station and said network, said mobile station authentication processor receiving a plurality of input values including a changeable key input value stored in a first location in memory and a fixed key input value, said mobile station authentication processor generating a plurality of output values including a ciphering key output value stored in a second location in memory and used to encipher a call, a changeable key output value and a network response output value, a system for linking the resetting of said changeable key input value in said mobile station to the validation of said network comprising:

means for transmitting from said network to said mobile station a signal indicative of a changeable key reset;

means for saving the changeable key input value stored in said first location to a third location in memory in response to the receipt of said changeable key reset signal;

means for saving the ciphering key output value stored in said second location to a fourth location in memory in response to the receipt of said changeable key reset signal;

means for setting the changeable key input value stored in said first location to a selected value;

means for executing said authentication algorithm on said mobile station authentication processor a first time;

means for setting the changeable key input value stored in said first location to the changeable key output value generated by said first execution of said authentication algorithm on said mobile station authentication processor;

means for setting the ciphering key output value stored in said second location to the ciphering key output value generated by said first execution of said authentication algorithm on said mobile station authentication processor;

means for transmitting from said network to said mobile station the network response output value generated in said network;

means for executing said authentication algorithm on said mobile station authentication processor a second time in response to the receipt of the network response output value generated in said network;

means for comparing the network response output value generated by said second execution of said authentication algorithm on said mobile station authentication processor with the network response output value generated in said network;

means for determining whether said network has transmitted to said mobile station a signal indicative of a changeable key update;

means for setting the changeable key input value stored in said first location to the changeable key output value generated by said second execution of said authentication algorithm on said mobile station authentication processor in response to an indication that the network response output value generated by said second execution of said authentication algorithm on said mobile station authentication processor matches the network response output value generated in said network and an indication that said mobile station has received said changeable key update signal from said network;

means for setting the changeable key input value stored in said first location to the changeable key input value stored in said third location in response to an indication that the network response output value generated by said second execution of said authentication algorithm on said mobile station authentication processor does not match the network response output value generated in said network or an indication that said mobile station has not received said changeable key update signal from said network; and means for setting the ciphering key output value stored in said second location to the ciphering key output value stored in said fourth location in response to said indication that the network response output value generated by said second execution of said authentication algorithm on said mobile station authentication processor does not match the network response output value generated in said network or said indication that said mobile station has not received said changeable key update signal from said network.

31. A system according to claim 30 further comprising:

means for saving the ciphering key output value generated by said second execution of said mobile station authentication algorithm to a fifth location in memory; and means for setting the ciphering key output value stored in said second location to the ciphering key output value stored in said fifth location to encipher a subsequent call.

32. A system according to claim 30 wherein said plurality of outputs of said mobile station authentication algorithm further include a first mobile station response signal output which is dependent on said fixed key input and independent of said changeable key input and a second mobile station response signal output which is dependent on said changeable key input, and said system further comprises means for sending the first and second mobile station response signals to said network in response to said indication that the network response signal generated by said second execution of said mobile station authentication algorithm matches the network response signal generated in said network.

33. In a radio network operating in a location register environment wherein a home location register stores mobile-specific information, including a rolling key assigned to a specific mobile station and used as an input value to an authentication processor in each of said mobile station and said network, and wherein said mobile station may be located in the service area of a visitor location register which stores callhandling information, a method for synchronizing the rolling key input value stored in said home location register with the rolling key input value used by said mobile station comprising the steps of:

setting the rolling key input value stored in said home location register to a selected value;

ordering said mobile station to set the rolling key input value used by said mobile station to said selected value; and setting the rolling key input value used by said mobile station to said selected value in response to said order.

34. A method according to claim 33 wherein said ordering step includes the steps of:

sending a request from said home location register to said visitor location register to order said mobile station to set the rolling key used by said mobile station to said selected value; and sending an order from said visitor location register to said mobile station to set the rolling key used by said mobile station to said selected value.

35. A method according to claim 34 further comprising the steps of:

sending a request from said home location register to said visitor location register to grant access to said mobile station; and sending a request from said home location register to said visitor location register to order said mobile station to perform a bilateral authentication of said network and said mobile station.

36. A method according to claim 33 wherein said authentication algorithm produces an authentication response signal and said method further comprises the steps of:

executing said authentication algorithm with the rolling key set to said selected value; and using at least a portion of said authentication response signal, generated by the execution of said authentication algorithm with the rolling key set to said selected value, to validate at least one of said mobile station and said network.

37. A method according to claim 33 wherein said authentication algorithm produces an encryption key and said method further comprises the steps of:

executing said authentication algorithm with the rolling key set to said selected value; and using the value of said encryption key, generated by the execution of said authentication algorithm with the rolling key set to said selected value, to encrypt communications between said mobile station and said network.

38. A method according to claim 33 further comprising the steps of: saving the value of the rolling key prior to being set to said selected value; and setting the value of the rolling key to the saved value if the rolling key has not been updated subsequent to being set to said selected value.

39. A method according to claim 38 wherein said selected value is the mobile identification number of said mobile station.

40. A method according to claim 38 wherein said selected value is the system identification of the home system of said mobile station.

41. In a radio network operating in a location register environment wherein a home location register stores mobile-specific information, including a rolling key assigned to a specific mobile station and used as an input value to an authentication processor in each of said mobile station and said network, and wherein said mobile station may be located in the service area of a visitor location register which stores callhandling information, a system for synchronizing the rolling key input value stored in said home location register with the rolling key input value used by said mobile station comprising:

means for setting the rolling key input value stored in said home location register to a selected value;

means for ordering said mobile station to set the rolling key input value used by said mobile station to said selected value; and means for setting the rolling key input value used by said mobile station to said selected value in response to said order.

42. A system according to claim 41 wherein said ordering means includes:

means for sending a request from said home location register to said visitor location register to order said mobile station to set the rolling key used by said mobile station to said selected value; and means for sending an order from said visitor location register to said mobile station to set the rolling key used by said mobile station to said selected value.

43. A system according to claim 42 further comprising:

means for sending a request from said home location register to said visitor location register to grant access to said mobile station; and means for sending a request from said home location register to said visitor location register to order said mobile station to perform a bilateral authentication of said network and said mobile station.

44. A system according to claim 41 wherein said authentication algorithm produces an authentication response signal and said system further comprises:

means for executing said authentication algorithm with the rolling key set to said selected value; and means for using at least a portion of said authentication response signal, generated by the execution of said authentication algorithm with the rolling key set to said selected value, to validate at least one of said mobile station and said network.

45. A method according to claim 41 wherein said authentication algorithm produces an encryption key and said system further comprises:

means for executing said authentication algorithm with the rolling key set to said selected value; and means for using the value of said encryption key, generated by the execution of said authentication algorithm with the rolling key set to said selected value, to encrypt communications between said mobile station and said network.

46. A system according to claim 41 further comprising:

means for saving the value of the rolling key prior to being set to said selected value; and means for setting the value of the rolling key to the saved value if the rolling key has not been updated subsequent to being set to said selected value.

47. A system according to claim 46 wherein said selected value is the mobile identification number of said mobile station.

48. A system according to claim 46 wherein said selected value is the system identification of the home system of said mobile station.

49. A method for the resynchronization of a rolling key used as an input value to an authentication processor in each of a mobile station and a radio network which communicates with said mobile station, said method comprising the steps:

maintaining in said mobile station a counter value indicative of the number of times the rolling key input value in said mobile station has been updated;

maintaining in said network a counter value indicative of the number of times the rolling key input value in said network has been updated;

incrementing the counter value in said mobile station each time the rolling key input value in said mobile station is updated;

incrementing the counter value in said network each time the rolling key input value in said network is updated;

transmitting the current counter value in said mobile station to said network;

comparing the current counter value received from said mobile station with the current counter value in said network; and setting the rolling key input value in said network to the current mobile station rolling key input value in response to an indication that the current counter value in said network is different from the current counter value received from said mobile station.

50. A method according to claim 49 wherein the current counter value in said mobile station is automatically transmitted to said network at the time said mobile station requests service from said network.

51. A method according to claim 49 wherein the current counter value in said mobile station is automatically transmitted to said network at the beginning of a call involving said mobile station.

52. A method according to claim 49 wherein said step of transmitting the current counter value in said mobile station to said network includes the steps of:

transmitting from said network to said mobile station a request for the current counter value in said mobile station; and transmitting from said mobile station to said network the current counter value in said mobile station in response to said request received from said network.

49

53. A system for the resynchronization of a rolling key used as an input value to an authentication processor in each of a mobile station and a radio network which communicates with said mobile station, said system comprising:
  means for maintaining in said mobile station a counter value indicative of the number of times the rolling key input value in said mobile station has been updated;
  means for maintaining in said network a counter value indicative of the number of times the rolling key input value in said network has been updated;
  means for incrementing the counter value in said mobile station each time the rolling key input value in said mobile station is updated;
  means for incrementing the counter value in said network each time the rolling key input value in said network is updated;
  means for transmitting the current counter value in said mobile station to said network;
  means for comparing the current counter value received from said mobile station with the current counter value in said network; and
  means for setting the rolling key input value in said network to the current mobile station rolling key input value in response to an indication that the current counter value in said network is different from the current counter value received from said mobile station.

54. A system according to claim 53 wherein the current counter value in said mobile station is automatically transmitted to said network at the time said mobile station requests service from said network.

55. A system according to claim 53 wherein the current counter value in said mobile station is automatically transmitted to said network at the beginning of a call involving said mobile station.

56. A system according to claim 53 wherein said means for transmitting the current counter value in said mobile station to said network includes:
  means for transmitting from said network to said mobile station a request for the current counter value in said mobile station; and
  means for transmitting from said mobile station to said network the current counter value in said mobile station in response to said request received from said network.

57. In a wireless communications system including a home network for a mobile station and first and second visited networks to which said mobile station may travel, a method for the resynchronization of a rolling key used as an input value to an authentication algorithm which is executed on an authentication processor in each of said mobile station and said home network, said authentication processor generating a plurality of security variables including a rolling key output value which replaces the rolling key input value when the rolling key is updated, said method comprising the steps of:
  maintaining in said mobile station a counter value indicative of the number of times the rolling key input value to said authentication processor in said mobile station has been updated;
  maintaining in said home network a counter value indicative of the number of times the rolling key input value to said authentication processor in said home network has been updated;

50 successively executing said authentication algorithm on said authentication processor is said home network a number of times to calculate a number of successive sets of security variables;
  updating the rolling key input value to said authentication processor in said home network at least once while calculating said successive sets of security variables;
  incrementing the counter value in said home network whenever the rolling key input value to said authentication processor is updated while calculating said successive sets of security variables;
  sending said successive sets of security variables and at least one rolling key update indicator from said home network to said first visited network;
  using at least a portion of said plurality of security variables and said at least one rolling key update indicator in the authentication of said mobile station in said first visited network;
  detecting the presence of said mobile station in said second visited network;
  determining whether said mobile station has updated the rolling key input value to said authentication processor in said mobile station while in said first visited network as often as said home network has updated the rolling key input value to said authentication processor in said home network while calculating said successive sets of security variables; and
  setting the rolling key input value in said home network to the current rolling key input value in said mobile station in response to an indication that said mobile station has not updated the rolling key input value to said authentication processor in said mobile station as often as said home network has updated the rolling key input value to said authentication processor in said home network while calculating said successive sets of security variables.

58. A method according to claim 57 wherein said step of determining whether said mobile station has updated the rolling key input to said authentication algorithm in said mobile station while in said first visited network as often as said home network has updated the rolling key input to said authentication algorithm in said home network while calculating said successive sets of security variables includes the steps of:
  transmitting from said mobile station to said second visited network the current counter value in said mobile station;
  transmitting from said second visited network to said home network the current counter value received from said mobile station; and
  comparing the current counter value in said mobile station with the current counter value in said home network.

59. A method according to claim 58 further comprising the step of setting the current counter value in said home network to the current counter value in said mobile station.

60. A method according to claim 58 wherein said step of setting the rolling key input in said home network to the current value of the rolling key input in said mobile station includes the steps of:
  storing the initial counter value in said home network at the beginning of the calculation of said successive sets of security variables;

storing all of the rolling key input values used in the calculation of said successive sets of security variables in said home network;

comparing the current counter value in said mobile station with the initial counter value stored in said home network to determine the actual number of times said mobile station has updated the rolling key input while in said first visited network; and setting the rolling key input in said home network to the rolling key input value used in the calculation of said successive sets of security variables after the home network has updated the rolling key input the same number of times as said mobile station has updated the rolling key input while in said first visited network.

61. A method according to claim 58 wherein said step of setting the rolling key input in said home network to the current value of the rolling key input in said mobile station includes the steps of:

storing the initial counter value in said home network at the beginning of the calculation of said successive sets of security variables;

storing the initial rolling key input value used in the calculation of said successive sets of security variables in said home network;

comparing the current counter value in said mobile station with the initial counter value stored in said home network to determine the actual number of times said mobile station has updated the rolling key input while in said first visited network;

setting the rolling key input in said home network to the stored initial rolling key input value used in the calculation of said successive sets of security variables in said home network;

executing said authentication algorithm in said home network the same number of times as said mobile station has updated the rolling key input while in said first visited network; and updating the rolling key input in said home network after each execution while executing said authentication algorithm in said home network the same number of times as said mobile station has updated the rolling key input while in said first visited network.

62. A method according to claim 57 wherein said step of determining whether said mobile station has updated the rolling key input to said authentication algorithm in said mobile station while in said first visited network as often as said home network has updated the rolling key input to said authentication algorithm in said home network while calculating said successive sets of security variables includes the steps of:

sending a request from said home network to said first visited network to identify the number of times said first visited network has successfully ordered said mobile station to update the rolling key input to said authentication algorithm in said mobile station; and sending from said first visited network to said home network in response to said request an indication of the number of times said first visited network has successfully ordered said mobile station to update the rolling key input to said authentication algorithm in said mobile station.

63. A method according to claim 57 wherein said step of setting the rolling key input in said home network to the current value of the rolling key input in said mobile station includes the steps of:

setting the rolling key input in said home network to a selected value;

sending a command from said second visited network to said mobile station to set the rolling key input in said mobile station to said selected value; and setting the rolling key input in said mobile station to said selected value in response to said command.

64. In a wireless communications system including a home network for a mobile station and first and second visited networks to which said mobile station may travel, a system for the resynchronization of a rolling key used as an input value to an authentication algorithm which is executed on an authentication processor in each of said mobile station and said home network, said authentication processor generating a plurality of security variables including a rolling key output value which replaces the rolling key input value when the rolling key is updated, said method comprising:

means for maintaining in said mobile station a counter value indicative of the number of times the rolling key input value to said authentication processor in said mobile station has been updated;

means for maintaining in said home network a counter value indicative of the number of times the rolling key input value to said authentication processor in said home network has been updated;

means for successively executing said authentication algorithm on said authentication processor in said home network a number of times to calculate a number of successive sets of security variables;

means for updating the rolling key input value to said authentication processor in said home network at least once while calculating said successive sets of security variables;

means for incrementing the counter value in said home network whenever the rolling key input value to said authentication processor is updated while calculating said successive sets of security variables;

means for sending said successive sets of security variables and at least one rolling key update indicator from said home network to said first visited network;

means for using at least a portion of said plurality of security variables and said at least one rolling key update indicator in the authentication of said mobile station in said first visited network;

means for detecting the presence of said mobile station in said second visited network;

means for determining whether said mobile station has updated the rolling key input value to said authentication processor in said mobile station while in said first visited network as often as said home network has updated the rolling key input value to said authentication processor in said home network while calculating said successive sets of security variables; and means for setting the rolling key input value in said home network to the current rolling key input value in said mobile station in response to an indication that said mobile station has not update the rolling key input value to said authentication processor in said mobile station as often as said home network has updated the rolling key input value to said authentication processor in said home network while calculating said successive sets of security variables.

65. A system according to claim 64 wherein said means for determining whether said mobile station has updated the rolling key input to said authentication algorithm in said mobile station while in said first visited network as often as said home network has updated the rolling key input to said authentication algorithm in said home network while calculating said successive sets of security variables includes:

means for transmitting from said mobile station to said second visited network the current counter value in said mobile station;

means for transmitting from said second visited network to said home network the current counter value received from said mobile station; and means for comparing the current counter value in said mobile station with the current counter value in said home network.

66. A system according to claim 65 further comprising means for setting the current counter value in said home network to the current counter value in said mobile station.

67. A system according to claim 65 wherein said means for setting the rolling key input in said home network to the current value of the rolling key input in said mobile station includes:

means for storing the initial counter value in said home network at the beginning of the calculation of said successive sets of security variables;

means for storing all of the rolling key input values used in the calculation of said successive sets of security variables in said home network;

means for comparing the current counter value in said mobile station with the initial counter value stored in said home network to determine the actual number of times said mobile station has updated the rolling key input while in said first visited network; and means for setting the rolling key input in said home network to the rolling key input value used in the calculation of said successive sets of security variables after the home network has updated the rolling key input the same number of times as said mobile station has updated the rolling key input while in said first visited network.

68. A system according to claim 65 wherein said means for setting the rolling key input in said home network to the current value of the rolling key input in said mobile station includes:

means for storing the initial counter value in said home network at the beginning of the calculation of said successive sets of security variables;

means for storing the initial rolling key input value used in the calculation of said successive sets of security variables in said home network;

means for comparing the current counter value in said mobile station with the initial counter value stored in said home network to determine the actual number of times said mobile station has updated the rolling key input while in said first visited network;

means for setting the rolling key input in said home network to the stored initial rolling key input value used in the calculation of said successive sets of security variables in said home network;

means for executing said authentication algorithm in said home network the same number of times as said mobile station has updated the rolling key input while in said first visited network; and means for updating the rolling key input in said home network after each execution while executing said authentication algorithm in said home network the same number of times as said mobile station has updated the rolling key input while in said first visited network.

69. A system according to claim 64 wherein said means for determining whether said mobile station has updated the rolling key input to said authentication algorithm in said mobile station while in said first visited network as often as said home network has updated the rolling key input to said authentication algorithm in said home network while calculating said successive sets of security variables includes:

means for sending a request from said home network to said first visited network to identify the number of times said first visited network has successfully ordered said mobile station to update the rolling key input to said authentication algorithm in said mobile station; and means for sending from said first visited network to said home network in response to said request an indication of the number of times said first visited network has successfully ordered said mobile station to update the rolling key input to said authentication algorithm in said mobile station.

70. A system according to claim 64 wherein said means for setting the rolling key input in said home network to the current value of the rolling key input in said mobile station includes:

means for setting the rolling key input in said home network to a selected value;

means for sending a command from said second visited network to said mobile station to set the rolling key input in said mobile station to said selected value; and means for setting the rolling key input in said mobile station to said selected value in response to said command.

* * * * *